(12) United States Patent
Iida

(10) Patent No.: US 7,151,991 B2
(45) Date of Patent: Dec. 19, 2006

(54) DRIVING-FORCE DISTRIBUTION CONTROL SYSTEM FOR FOUR-WHEEL-DRIVE VEHICLES

(75) Inventor: Norio Iida, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 432 days.

(21) Appl. No.: 10/651,095

(22) Filed: Aug. 29, 2003

(65) Prior Publication Data

US 2004/0064233 A1 Apr. 1, 2004

(30) Foreign Application Priority Data

Sep. 26, 2002 (JP) .............................. 2002-280653

(51) Int. Cl.
*G06F 17/00* (2006.01)
(52) U.S. Cl. ....................................... 701/69
(58) Field of Classification Search ................ 701/69, 701/81
See application file for complete search history.

(56) References Cited

U.S. PATENT DOCUMENTS 6,722,482 B1 * 4/2004 Takuno et al. ................ 192/35

6,726,593 B1 * 4/2004 Yamamoto et al. ............ 477/5

FOREIGN PATENT DOCUMENTS

| JP | 4-103433 A | 4/1992 |
| JP | 2001-253261 A | 9/2001 |

* cited by examiner

*Primary Examiner*—Thu V. Nguyen
(74) *Attorney, Agent, or Firm*—Foley & Lardner LLP

(57) ABSTRACT

In a power distribution control system for a four-wheel-drive vehicle, a 4WD controller is electronically connected to a friction clutch for controlling a torque distribution ratio. The 4WD controller determines whether a past-history condition, a command torque, and a reversal-of-torque condition that an input direction of torque inputted into the friction clutch is reversed is satisfied. The 4WD controller outputs a countermeasure-of-noise command torque decreased from the current command torque as a command signal for the friction clutch, when the past-history condition, the command torque condition, and the reversal-of-torque condition are all satisfied.

20 Claims, 14 Drawing Sheets

US 7,151,991 B2

DRIVING-FORCE DISTRIBUTION CONTROL SYSTEM FOR FOUR-WHEEL-DRIVE VEHICLES

TECHNICAL FIELD

The present invention relates to a driving-force distribution control system for use with a four-wheel-drive vehicle with a torque distributing friction clutch, called transfer clutch, through which engine power (driving torque) is delivered to primary drive wheels of the vehicle and to secondary drive wheels at a desired distribution ratio that is determined based on a force of engagement of the transfer clutch, and specifically to a system capable of reducing noise and vibrations, which may occur within the transfer clutch during a transition from a straight-ahead driving state of a four-wheel-drive vehicle to a cornering state.

BACKGROUND ART

As is well known, when shifting from a straight-ahead driving state of to a cornering state on four-wheel-drive (4WD) vehicles, a so-called tight-corner braking phenomenon takes place, because of insufficient absorption of the wheel-speed difference between front and rear road wheels. As briefly described hereunder, Japanese Patent Provisional Publication No. 2001-253261 (hereinafter is referred to as "JP2001-253261") teaches the avoidance of a tight-corner braking phenomenon peculiar to four-wheel-drive vehicles. In the power distribution controller described in JP2001-253261, a turning radius R of the 4WD vehicle is estimated based on the vehicle speed and lateral acceleration exerted on the 4WD vehicle during cornering. When the estimated turning radius R is less than a predetermined threshold value $R_0$, a distribution ratio of a secondary-drive-wheel torque to a primary-drive-wheel torque is decreasingly compensated for based on the estimated turning radius, so as to optimize the secondary-drive-wheel-to-primary-drive-wheel torque distribution ratio and thus to properly avoid the tight-corner braking phenomenon.

SUMMARY OF THE INVENTION

When the four-wheel-drive vehicle goes around a curve in the four-wheel-drive operating mode and thus an average rotational speed of the secondary drive wheels (subsidiary drive wheels) is higher than an average rotational speed of the primary drive wheels (main drive wheels), there is an increased tendency for noise to be produced within the friction clutch prior to the occurrence of the tight-corner braking phenomenon, because of positive-to-negative input-torque fluctuation or reversal of input direction of torque inputted to the secondary drive wheels (hereinafter is simply referred to as "reversal of torque". In more detail, in a four-wheel-drive vehicle with a torque distributing friction clutch, called transfer clutch, through which a distribution ratio of torque to be delivered to the secondary drive wheels to torque to be delivered to the primary drive wheels, is variably adjusted for example from 0:100% toward 50%:50% by varying the engagement force of the clutch, a driving force (a driving torque) produced by a source for driving power (an engine) is transferred or input via the friction clutch into the secondary drive wheels during the normal straight-ahead driving. When shifting from the straight-ahead driving state to the turning state, the front road wheel, serving as the secondary drive wheel, tends to rotate faster than the rear road wheel, serving as the primary drive wheel, owing to the turning-radius difference between the front and rear wheels. As a result of this, torque is transferred from the secondary drive wheel (the front road wheel) back to the friction clutch. The torque, transferred from the secondary drive wheel back to the friction clutch, is hereinafter is referred to as "counter-flow torque", since the direction of such torque flow, transferred from the secondary drive wheel back to the friction clutch on turns, is opposite to that of normal torque flow, transferred from the power source via the friction clutch into the secondary drive wheel. If the magnitude of the counter-flow torque, transferred and input from the secondary drive wheel side into the friction clutch, exceeds the magnitude of input torque (normal torque), transferred from the power source via the friction clutch into the secondary drive wheel side, a transition from positive input torque application to negative input torque application, that is, the previously-discussed reversal of torque occurs. In other words, the value of input torque applied to the secondary drive wheel changes from plus to minus. Also, the reversal of torque inputted to the secondary drive wheel means a reversal of torque-flow direction of torque inputted into the friction clutch. Due to the "reversal of torque", exactly, the reversal of torque-flow direction of torque inputted into the friction clutch, the friction clutch tends to shift from the twisted state to the released state. Generally, in the friction-clutch twisted state during normal torque application, that is, during positive input torque application, one relatively-rotatable friction-contact portion of the friction clutch tends to bite into and stick fast to the other relatively-rotatable friction-contact portion due to the twisting moment, in other words, torsional torque. Assuming that the value of input torque applied to the secondary drive wheel changes from positive to negative and thus the "reversal of torque" occurs, the friction clutch may also momentarily shift from an engaged state (or a coupled state) that the two adjacent relatively-rotatable friction-contact portions are bit into and stuck fast together by way of the twisting moment to a disengaged state (or an uncoupled state) that the two adjacent relatively-rotatable friction-contact portions are disengaged from each other to permit relative rotation therebetween. The momentary release of the friction clutch, arising from the transition from positive input torque application to negative input torque application, that is, the "reversal of torque", is actually achieved by separating at least two adjacent relatively-rotatable friction-contact portions, which are bit into and stuck fast together, from each other by force. As a result, undesired noise (unwanted sound, perceived audibly and/or tactually) occurs within the friction clutch prior to the occurrence of the tight-corner braking phenomenon when the 4WD goes around a curve.

Accordingly, it is an object of the invention to provide a driving-force distribution control system for a four-wheel-drive vehicle, capable of preventing noise and vibrations from occurring within a friction clutch even when the value of input torque applied to a secondary drive wheel changes from positive to negative and thus the friction clutch momentarily shifts from its engaged state that at least two adjacent relatively-rotatable friction-contact portions are bit into and stuck fast together by a twisting moment to a disengaged state that the adjacent relatively-rotatable friction-contact portions are disengaged and separated from each other by force.

In order to accomplish the aforementioned and other objects of the present invention, a driving-force distribution control system for a four-wheel-drive vehicle comprises a friction clutch through which a driving force produced by a driving power source is delivered to primary drive wheels and to secondary drive wheels at a distribution ratio based on an operating condition of the vehicle, and a four-wheel-drive vehicle controller configured to be electronically connected to the friction clutch for automatically controlling the distribution ratio, the four-wheel-drive vehicle controller comprising a torque threshold value setting section that sets a lower limit torque, above which noise and vibrations take place within the friction clutch when an input direction of torque inputted into the friction clutch is reversed, as a predetermined torque threshold value, an input-torque past-history condition decision section that determines whether a past-history condition that a clutch input torque has been greater than or equal to the predetermined torque threshold value is satisfied when a command torque for the friction clutch is greater than or equal to the predetermined torque threshold value during a time period from a time when the command torque begins to rise from a zero torque level to a current execution cycle of the driving-force distribution control system, a command torque condition decision section that determines whether a command torque condition that a current value of the command torque, produced at the current execution cycle, is greater than or equal to the predetermined torque threshold value is satisfied, a reversal-of-torque condition decision section that determines whether a reversal-of-torque condition that an input direction of torque inputted into the friction clutch is reversed is satisfied, a countermeasure-of-noise command torque calculation section that calculates a countermeasure-of-noise command torque obtained by decreasingly compensating for the current value of the command torque when the past-history condition, the command torque condition, and the reversal-of-torque condition are all satisfied, and a clutch command torque control section that outputs a command signal corresponding to the countermeasure-of-noise command torque to the friction clutch, when the past-history condition, the command torque condition, and the reversal-of-torque condition are all satisfied.

According to another aspect of the invention, a driving-force distribution control system for a four-wheel-drive vehicle comprises a friction clutch through which a driving force produced by a driving power source is delivered to primary drive wheels and to secondary drive wheels at a distribution ratio based on an operating condition of the vehicle, and a four-wheel-drive vehicle controller configured to be electronically connected to the friction clutch for automatically controlling the distribution ratio, the four-wheel-drive vehicle controller comprising a torque threshold value setting means for setting a lower limit torque, above which noise and vibrations take place within the friction clutch when an input direction of torque inputted into the friction clutch is reversed, as a predetermined torque threshold value, an input-torque past-history condition decision means for determining whether a past-history condition that a clutch input torque has been greater than or equal to the predetermined torque threshold value is satisfied when a command torque for the friction clutch is greater than or equal to the predetermined torque threshold value during a time period from a time when the command torque begins to rise from a zero torque level to a current execution cycle of the driving-force distribution control system, a command torque condition decision means for determining whether a command torque condition that a current value of the command torque, produced at the current execution cycle, is greater than or equal to the predetermined torque threshold value is satisfied, a reversal-of-torque condition decision means for determining whether a reversal-of-torque condition that an input direction of torque inputted into the friction clutch is reversed is satisfied, a countermeasure-of-noise command torque calculation means for calculating a countermeasure-of-noise command torque obtained by decreasingly compensating for the current value of the command torque when the past-history condition, the command torque condition, and the reversal-of-torque condition are all satisfied, and a clutch command torque control means for outputting a command signal corresponding to the countermeasure-of-noise command torque to the friction clutch when the past-history condition, the command torque condition, and the reversal-of-torque condition are all satisfied.

According to a still further aspect of the invention, a method of controlling a torque distribution ratio of a four-wheel-drive vehicle employing a friction clutch through which a driving torque produced by a driving power source is delivered to primary drive wheels and to secondary drive wheels at a desired distribution ratio based on an operating condition of the vehicle, the method comprises setting a lower limit torque, above which noise and vibrations take place within the friction clutch when an input direction of torque inputted into the friction clutch is reversed, as a predetermined torque threshold value, determining whether a past-history condition that a clutch input torque has been greater than or equal to the predetermined torque threshold value is satisfied when a command torque for the friction clutch is greater than or equal to the predetermined torque threshold value during a time period from a time when the command torque begins to rise from a zero torque level to a current execution cycle, determining whether a command torque condition that a current value of the command torque, produced at the current execution cycle, is greater than or equal to the predetermined torque threshold value is satisfied, determining whether a reversal-of-torque condition that an input direction of torque inputted into the friction clutch is reversed is satisfied, calculating a countermeasure-of-noise command torque obtained by decreasingly compensating for the current value of the command torque when the past-history condition, the command torque condition, and the reversal-of-torque condition are all satisfied, and outputting a command signal corresponding to the countermeasure-of-noise command torque to the friction clutch when the past-history condition, the command torque condition, and the reversal-of-torque condition are all satisfied.

The other objects and features of this invention will become understood from the following description with reference to the accompanying drawings.

DESCRIPTION OF THE PREFERRED EMBODIMENTS

Figure 1:
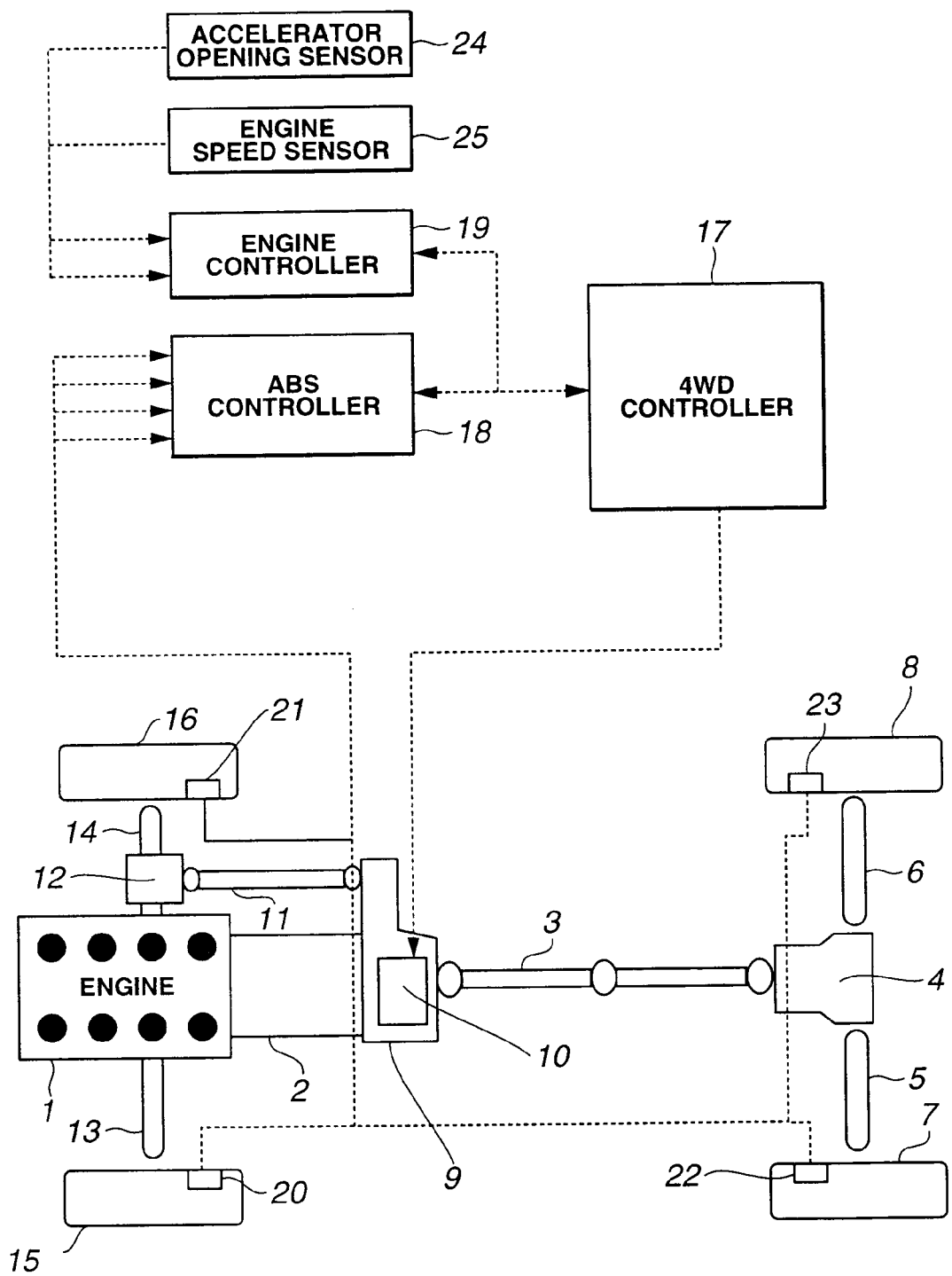
FIG. 1 is a system block diagram illustrating a first embodiment of a driving-force distribution control system for a 4WD vehicle.

Referring now to the drawings, particularly to FIG. 1, the driving-force distribution control system of the invention is exemplified in a front-engine, four-wheel-drive vehicle with a torque distributing friction clutch, called transfer clutch, through which a distribution ratio of torque to be delivered to secondary drive wheels (front road wheels) to torque to be delivered to primary drive wheels (rear road wheels), is steplessly controlled and variably adjusted from 0:100% toward 50%:50% by varying an engagement force of the clutch. In FIG. 1, reference sign 1 denotes an internal combustion engine serving as a prime mover (a source for driving power). Reference sign 2 denotes a transmission, reference sign 3 denotes a rear propeller shaft, reference sign 4 denotes a rear differential, reference sign 5 denotes a rear-left axle driveshaft, and reference sign 6 denotes a rear-right axle driveshaft. Reference signs 7 and 8 respectively denote rear-left and rear-right road wheels, both serving as primary drive wheels (main drive wheels). Reference sign 9 denotes a transfer, whereas reference sign 10 denotes an electronically-controlled coupling serving as an electronically-controlled friction clutch or an electronically-controlled transfer clutch. The force of clutch engagement of coupling 10 can be electronically controlled in response to a command signal (corresponding to a coupling command torque) from a 4WD controller 17 (described later). Reference sign 11 denotes a front propeller shaft, and reference sign 12 denotes a front differential. Reference sign 13 denotes a front-left axle driveshaft, and reference sign 14 denotes a front-right axle driveshaft. Reference signs 15 and 16 respectively denote front-left and front-right road wheels, both serving as secondary drive wheels (subsidiary drive wheels). An input interface of an ABS controller 18 is electrically connected to front-left, front-right, rear-left, and rear-right wheel speed sensors 20, 21, 22, and 23, to receive signals from these wheel speed sensors, respectively detecting or monitoring front-left, front-right, rear-left, and rear-right wheel speeds Vwfl, Vwfr, Vwrl, and Vwrr, which are collectively referred to as Vw. On the other hand, an input interface of an engine controller 19 is electrically connected to an accelerator opening sensor 24 and an engine speed sensor 25, to receive signals from sensors 24 and 25, respectively detecting or monitoring an accelerator opening Acc and an engine speed Ne. 4WD controller 17, ABS controller 18, and engine controller 19 are mutually communicated with each other through LAN communication lines or data links for intercommunication. In the front-engine, four-wheel-drive vehicle shown in FIG. 1, in a basic rear-wheel-drive mode, power (driving torque) from engine 1 is delivered via transmission 2 through rear propeller shaft 3, rear differential 4, and rear axle driveshafts 5 and 6 to rear wheels (main drive wheels) 7 and 8, with electronically-controlled coupling 10 released. In this basic rear-wheel-drive mode, a distribution ratio of a secondary-drive-wheel torque to a primary-drive-wheel torque is 0:100%. The greater the force of engagement of coupling 10, the higher the distribution ratio of torque to be delivered to the front wheels (the secondary drive wheels) with respect to torque to be delivered to the rear wheels (the primary drive wheels). As discussed above, in the first embodiment, the torque distribution ratio can be continuously varied within the predetermined range from 0:100% to 50%:50%, by adjusting the force of engagement of coupling 10. The magnitude of the force of engagement of coupling 10 varies depending on the magnitude of the driving current applied from 4WD controller 17 to coupling 10.

Figure 2:
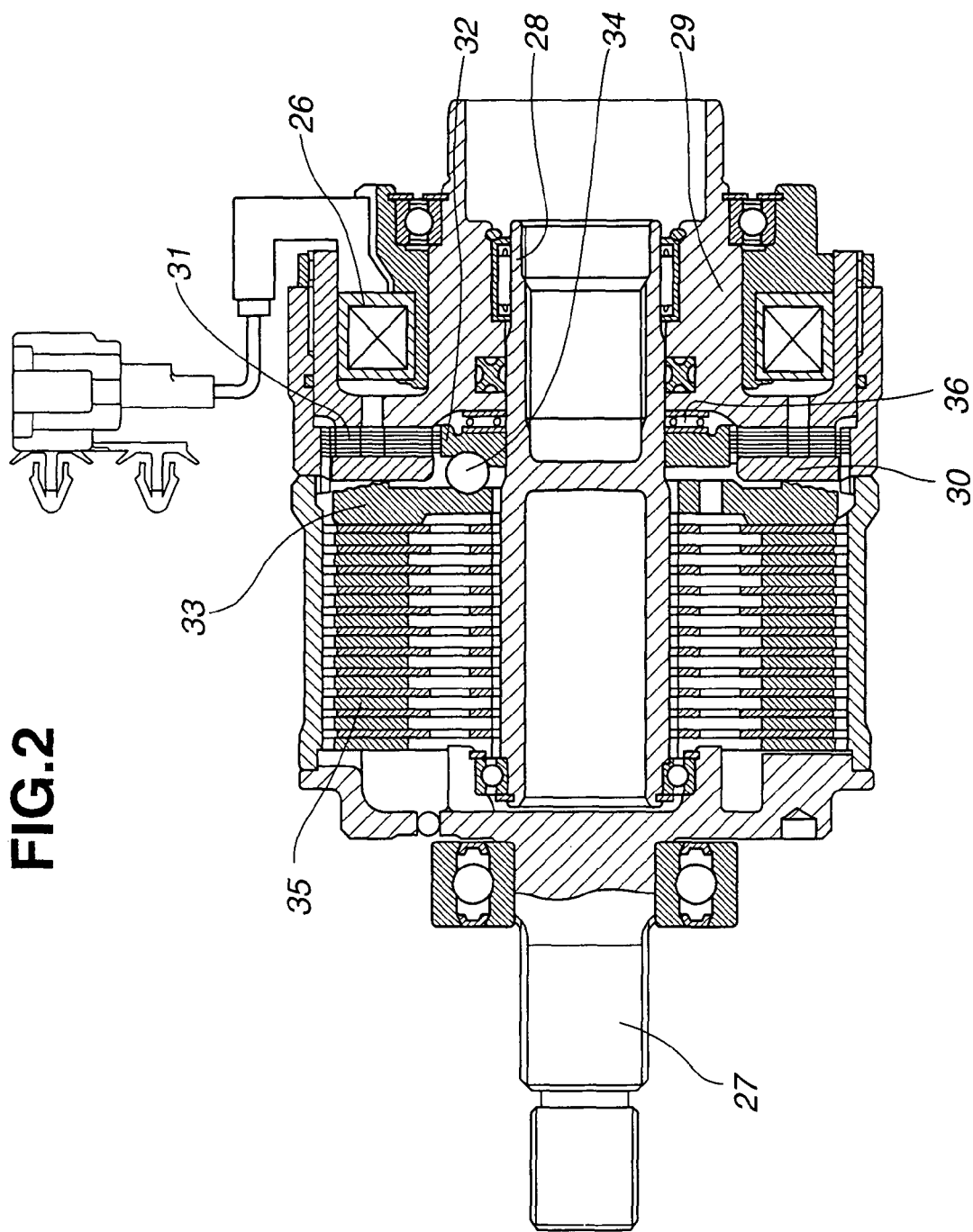
FIG. 2 is a cross-sectional view of an electronically-controlled coupling incorporated in the driving-force distribution control system of the shown embodiments.
Figures 3A, 3B, 3C:
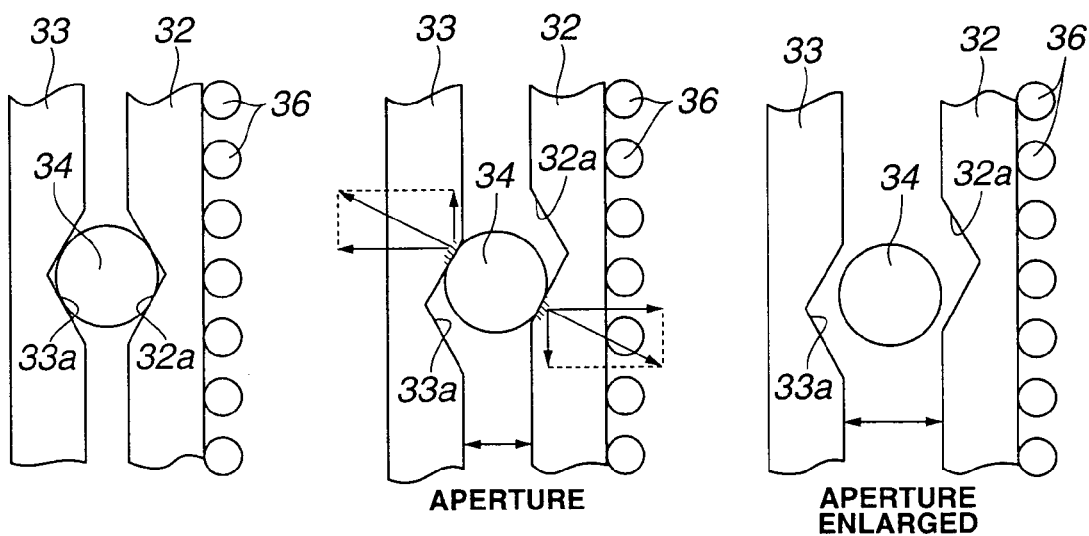
FIGS. 3A–3C are explanatory views showing the operation of a cam mechanism incorporated in the electronically-controlled coupling of the driving-force distribution control system of the shown embodiments.

FIG. 2 shows the longitudinal cross section of electronically-controlled coupling (friction clutch) 10, whereas FIGS. 3A–3C explain the operation of the cam mechanism built in coupling 10. As can be seen from the cross section of FIG. 2, coupling 10 is constructed as an electromagnetically-operated coupling equipped with an electromagnetic solenoid 26. A clutch input shaft 27 is connected to rear propeller shaft 3, whereas a clutch output shaft 28 is connected to front propeller shaft 11. A main clutch 35 is disposed and interleaved between clutch input shaft 27 and clutch output shaft 28. Additionally, a pilot clutch 31 is disposed and interleaved between a clutch housing 29 and a pilot cam 32. As clearly shown in FIGS. 2, and 3A–3C, in addition to pilot cam 32, the cam mechanism includes a main cam 33, and a ball 34 sandwiched between a cam groove (a V-grooved cam contour surface composed of two tapered surfaces having different inclined angles) 32a of pilot cam 32 and a cam groove (a V-grooved cam contour surface composed of two tapered surfaces having different inclined angles) 33a of main cam 33. In FIG. 2, a component part denoted by reference sign 30 is an armature, while a component part denoted by reference sign 36 is a needle bearing. The engaging operation or coupling operation of electronically-controlled coupling 10 is hereunder described in detail.

When the solenoid driving current (the solenoid exciting current) is generated from 4WD controller 17 and thus electromagnetic solenoid 26 is energized, a magnetic field exists around electromagnetic solenoid 26. As a result, armature 30 is pulled against pilot clutch 31 by way of an attraction force and the aperture defined between pilot cam 32 and main cam 33 gradually narrows and therefore a transition from the uncoupled state (see FIG. 3C) of coupling 10 to the fully-coupled state (see FIG. 3C) takes place. FIG. 3B shows the elastically-deformed state (described later) of the cam mechanism (32, 33, 34) of coupling 10. With armature 30 attracted toward pilot clutch 31, friction torque is created or produced in pilot clutch 31. The friction torque is transmitted from pilot clutch 31 to pilot cam 32 of the cam mechanism. Then, as appreciated from FIGS. 3A–3C, the friction torque, which is transferred from pilot clutch 31 to pilot cam 32, is further multiplied and converted into an axial torque acting in the axial direction of clutch input shaft 27, by means of cam grooves 32a and 33a and ball 34 in friction-contact with each other. The axial torque multiplied acts to force main cam 33 axially against the rightmost end of main clutch 35 (viewing FIG. 2). In this manner, main clutch 35 also produces a friction torque whose magnitude is proportional to the magnitude of the solenoid driving current, by forcing main cam 33 axially against main clutch 35. The friction torque produced by main clutch 35 of coupling 10 is delivered or transmitted via clutch output shaft 28 to front propeller shaft 11.

Returning to FIG. 1, each of 4WD controller 17, ABS controller 18, and engine controller 19 generally comprises a microcomputer. Each of controllers 17–19 includes an input/output interface (I/O), memories (RAM, ROM), and a microprocessor or a central processing unit (CPU). The input/output interface (I/O) of each of controllers 17–19 receives input information from various engine/vehicle sensors as previously described. Within each of controllers 17–19, the central processing unit (CPU) allows the access by the I/O interface of input informational data signals from the previously-discussed engine/vehicle sensors. The CPU of 4WD controller 17 is responsible for carrying the coupling delivered-torque control program and the tight-corner period delivered-torque calculation program stored in memories and is capable of performing necessary arithmetic and logic operations which will be fully described later. A computational result (an arithmetic calculation result), that is, a calculated output signal is relayed through the output interface circuitry of the 4WD controller to an output stage, namely electromagnetic solenoid 26 of electronically-controlled coupling 10.

Figure 4A:
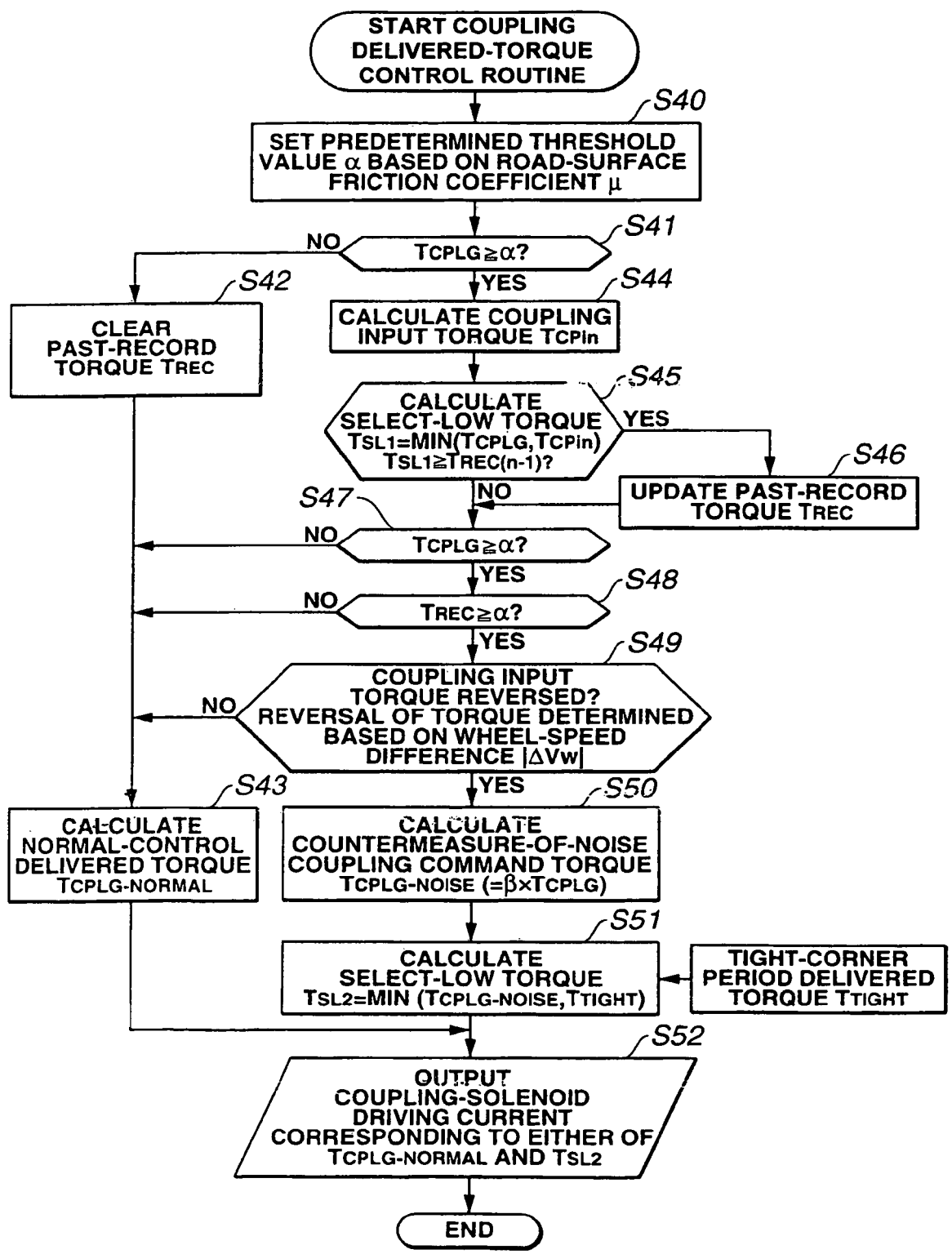
FIG. 4A is a flow chart showing a coupling delivered-torque control routine executed within a 4WD controller included in the driving-force distribution control system of the first embodiment.

Referring now to FIG. 4A, there is shown the coupling delivered-torque control routine executed within 4WD controller 17 of the driving-force distribution control system of the first embodiment. The arithmetic processing shown in FIG. 4A is executed as time-triggered interrupt routines to be triggered every predetermined sampling time intervals such as 10 milliseconds.

Figure 5:
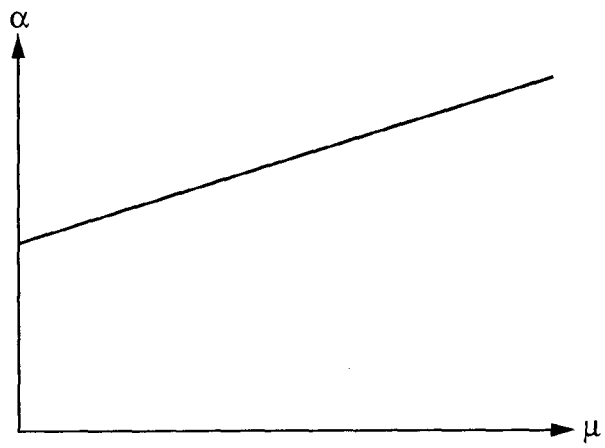
FIG. 5 is a predetermined characteristic diagram showing the relationship between a road-surface friction coefficient μ and a predetermined threshold value α.

At step S40, a predetermined threshold value (exactly, a predetermined torque threshold value) α is determined or set or retrieved based on a road-surface friction coefficient μ from a predetermined or preprogrammed μ-α characteristic map (see FIG. 5). A lower limit torque above which the previously-noted "noise and vibrations" take place within the friction clutch (coupling 10) when the input direction of torque inputted into the friction clutch is reversed, is set as predetermined torque threshold value α. Thereafter, the routine proceeds to step S41. FIG. 5 shows an example of the road-surface friction coefficient μ versus predetermined threshold value α characteristic diagram (simply, the preprogrammed μ-α characteristic map). According to the preprogrammed μ-α characteristic map of FIG. 5, predetermined threshold value α gradually increases, as road-surface friction coefficient μ increases. In the shown embodiments, the preprogrammed μ-α characteristic map shown in FIG. 5 is designed so that road-surface friction coefficient μ and predetermined threshold value α are in direct proportion to each other. An estimate of the road-surface friction coefficient, which is obtained and estimated by monitoring a degree of wheel slippage with respect to the degree of the accelerator pedal's depression, is generally used as input information regarding road-surface friction coefficient μ. Concretely, in estimating or arithmetically calculating the degree of wheel slippage in other words, road-surface friction coefficient μ, sensor signal values from wheel speed sensors 20–23 used in the ABS control system are used. In lieu thereof, in case of an automated highway equipped with an infrastructure, a detected value of the road-surface friction coefficient, which is obtained and received by way of mutual communication between the vehicle and the on-road network (or the on-road sensor) contained in the infrastructure, may be used as input information regarding road-surface friction coefficient μ.

At step S41, a check is made to determine whether a coupling command torque $T_{CPLG}$, corresponding to a signal value of the command signal that is output from 4WD controller 17 to coupling 10, that is, the current value of driving current applied to electromagnetic solenoid 26, is greater than or equal to predetermined threshold value α, which is retrieved from the predetermined μ-α characteristic map of FIG. 5 through step S40. When the answer to step S41 is in the negative (NO), i.e., in case of $T_{CPLG} < α$, the routine proceeds from step S41 to step S42. Conversely when the answer to step S41 is in the affirmative (YES), i.e., in case of $T_{CPLG} \geq α$, the routine proceeds from step S41 to step S44.

At step S42, a past-record torque $T_{REC}$ is cleared responsively to the decision result of step S41, indicative of $T_{CPLG} < α$. Thereafter, the routine flows from step S42 to step S43.

At step S43, a normal-control delivered torque $T_{CPLG-NORMAL}$ is arithmetically calculated based on a wheel-speed difference between front and rear wheels. Thereafter, the routine flows from step S43 to step S52.

At step S44, a coupling input torque $T_{CPin}$ is arithmetically calculated responsively to the decision result of step S41, indicative of $T_{CPLG} \geq α$. Thereafter, the routine proceeds from step S44 to step S45. For instance, in calculating or estimating coupling input torque $T_{CPin}$, first, an engine torque is estimated based on engine speed Ne and accelerator opening Acc. Then, the estimated engine torque is multiplied with a gear ratio of transmission 2, such that coupling input torque $T_{CPin}$ is obtained as the product of the estimated engine torque and the transmission ratio.

At step S45, a lower one $T_{SL1}$ of coupling command torque $T_{CPLG}$ extracted through step S41 and coupling input torque $T_{CPin}$ calculated through step S44 is selected by way of a so-called select-LOW process MIN($T_{CPLG}$, $T_{CPin}$). The lower torque $T_{SL1}$ will be hereinafter referred to as "select-LOW torque $T_{SL1}$". Additionally, at step S45, a check is made to determine whether select-LOW torque $T_{SL1}$(=MIN($T_{CPLG}$, $T_{CPin}$)) is greater than or equal to a previous value $T_{REC(n-1)}$) of past-record torque $T_{REC}$ (simply, a previous past-record torque $T_{REC(n-1)}$) stored in the predetermined memory address. When the answer to step S45 is affirmative ($T_{SL1} \geq T_{REC(n-1)}$), the routine proceeds from step S45 to step S46. Conversely when the answer to step S45 is negative ($T_{SL1} < T_{REC(n-1)}$), the routine proceeds from step S45 to step S47.

At step S46, a current value $T_{REC(n)}$ of past-record torque $T_{REC}$ (simply, a current past-record torque $T_{REC(n)}$) is updated by select-LOW torque $T_{SL1}$. Thereafter, the routine proceeds from step S46 to step S47.

At step S47, in the same manner as step S41, a check is made to determine whether coupling command torque $T_{CPLG}$ is greater than or equal to predetermined threshold value $\alpha$. When the answer to step S47 is affirmative ($T_{CPLG} \geq \alpha$), the routine proceeds to step S48. Conversely when the answer to step S47 is negative ($T_{CPLG} < \alpha$), the routine proceeds to step S43.

At step S48, a check is made to determine whether the latest up-to-date past-record torque $T_{REC}$ is greater than or equal to predetermined threshold value $\alpha$. When the answer to step S48 is affirmative ($T_{REC} \geq \alpha$), the routine proceeds to step S49. Conversely when the answer to step S48 is negative ($T_{REC} < \alpha$), the routine proceeds to step S43.

Figure 6A:
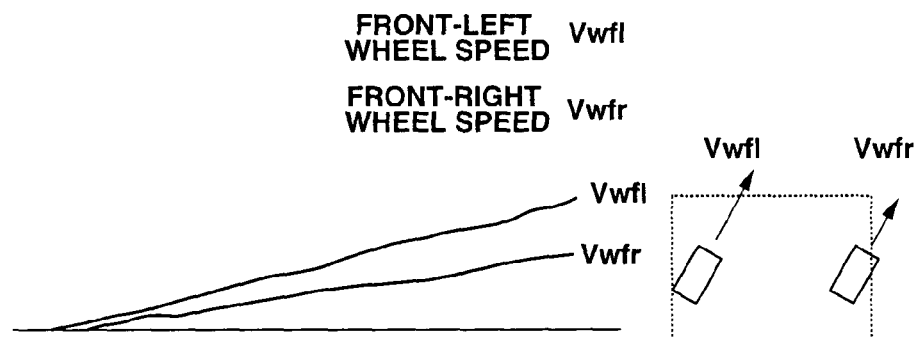
FIGS. 6A and 6B are characteristic diagrams respectively showing (i) variations of front-left and front-right wheel speeds Vwfl and Vwfr, and (ii) variations of a wheel-speed difference |ΔVw| between the front-left and front-right wheel speeds and a predetermined reversal-of-torque criterion front-left-and-front-right wheel-speed difference $\Delta Vw_0$ (related to step S49 of FIG. 4A).
Figure 6B:
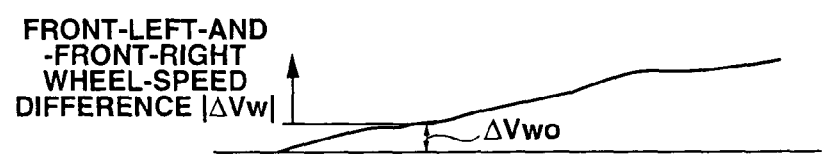

At step S49, a check is made, based on the wheel-speed difference (exactly, the absolute value of the wheel speed difference, i.e., |Vwfl−Vwfr|=|ΔVw|) between front-left and front-right wheel speeds Vwfl and Vwfr, whether the input direction of torque flow into coupling 10 is reversed. During turns, the wheel-speed difference (|Vwfl−Vwfr|=|ΔVw|) between front-left and front-right wheel speeds arises from the difference between the turning radius of front-left and front-right road wheels 15 and 16, that is, the difference of wheel travel between the outer front wheel and the inner front wheel. Actually, in the system of the first embodiment shown in FIG. 4A, the presence or absence of reversal of input direction of torque flow into coupling 10, in other words, the presence or absence of reversal of torque applied to the secondary drive wheels, is determined depending on whether wheel-speed difference |ΔVw| between front-left and front-right wheel speeds is greater than or equal to a predetermined reversal-of-torque criterion $\Delta Vw_0$. As appreciated from the characteristic diagrams shown in FIGS. 6A and 6B, when wheel-speed difference |ΔVw| is greater than or equal to predetermined reversal-of-torque criterion $\Delta Vw_0$ (|ΔVw|$\geq \Delta Vw_0$), the processor of 4WD controller 17 determines that the reversal of input direction of torque flow into coupling 10 (i.e., the reversal of torque applied to the secondary drive wheels) occurs. When the answer to step S49 is affirmative (YES), that is, the reversal of input direction of torque flow into coupling 10 occurs, the routine proceeds from step S49 to step S50. Conversely when the answer to step S49 is negative (NO), that is, the reversal of input direction of torque flow into coupling 10 does not occur, the routine proceeds from step S49 to step S43.

When the previously-noted three conditions, namely the first condition (the coupling-command-torque $T_{CPLG}$ condition) defined by the inequality $T_{CPLG} \geq \alpha$ (see step S47), the second condition (the past-record-torque $T_{REC}$ condition or the coupling-input-torque ($T_{CPin}$) past-history condition) defined by the inequality $T_{REC} \geq \alpha$ (see step S48), and the third condition (the reversal-of-torque condition) that the reversal of input direction of torque inputted into coupling 10 is present (see step S49) are all satisfied during execution of the current control cycle (the current routine), the processor of 4WD controller 17 determines that there is an increased tendency (or a high possibility) of the occurrence of noise (unwanted sound) and vibrations created in the main clutch 35 of coupling 10. For the reasons discussed above, when the answers to steps S47, S48, and S49 are all affirmative (YES), step S50 occurs.

At step S50, a countermeasure-of-noise coupling command torque $T_{CPLG-NOISE}$ is computed or calculated by decreasingly compensating for the current value of coupling command torque $T_{CPLG}$ (the latest up-to-date coupling command torque $T_{CPLG}$). Concretely, countermeasure-of-noise coupling command torque $T_{CPLG-NOISE}$ is calculated by multiplying the current value of coupling command torque $T_{CPLG}$ with a predetermined reduction rate $\beta$ such as 0.8, from an expression $T_{CPLG-NOISE} = \beta \times T_{CPLG} = 0.8 \times T_{CPLG}$. In case of the use of the predetermined reduction rate $\beta$ (e.g., 0.8), the higher the magnitude of the current coupling command torque $T_{CPLG}$, the greater the decrement, that is, the deviation of countermeasure-of-noise coupling command torque $T_{CPLG-NOISE}$ from the current coupling command torque $T_{CPLG}$.

Figure 4B:
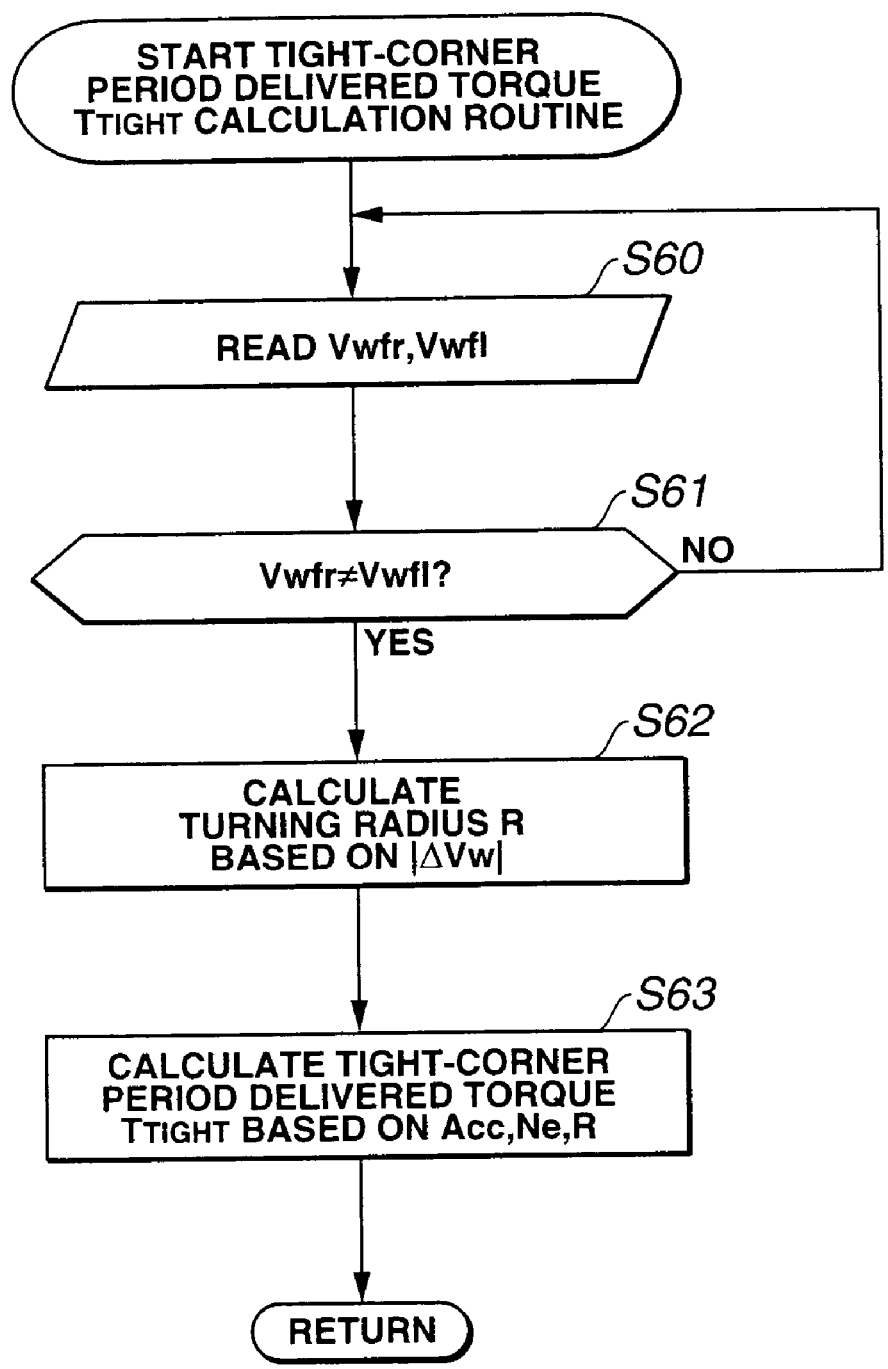
FIG. 4B is a flow chart showing a tight-corner period delivered-torque calculation routine.

At step S51, first, countermeasure-of-noise coupling command torque $T_{CPLG-NOISE}$ calculated through step S50 and tight-corner period delivered torque $T_{TIGHT}$ calculated through the tight-corner period delivered-torque calculation routine shown in FIG. 4B are read. Second, a lower one $T_{SL2}$ of countermeasure-of-noise coupling command torque $T_{CPLG-NOISE}$ and tight-corner period delivered torque $T_{TIGHT}$ is selected by way of a so-called select-LOW process MIN ($T_{CPLG-NOISE}$, $T_{TIGHT}$). The lower torque $T_{SL2}$ will be hereinafter referred to as "select-LOW torque $T_{SL2}$". After step S51, step S52 occurs.

In case of the flow from step S43 to step S52, the output interface of 4WD controller 17 outputs a solenoid driving current corresponding to normal-control delivered torque $T_{CPLG-NORMAL}$ calculated through step S43 to electronic solenoid 26 of electronically-controlled coupling 10. On the contrary, in case of the flow from step S51 to step S52, the output interface of 4WD controller 17 outputs a solenoid driving current corresponding to select-LOW torque $T_{SL2}$(=MIN ($T_{CPLG-NOISE}$, $T_{TIGHT}$)) calculated through step S51 to electronic solenoid 26 of coupling 10.

Referring now to FIG. 4B, there is shown the tight-corner period delivered torque $T_{TIGHT}$ calculation subroutine that is executed within 4WD controller 17 as time-triggered interrupt routines to be triggered every predetermined sampling time intervals such as 10 milliseconds.

At step S60, front-right wheel speed Vwfr from front-right wheel speed sensor 21 and front-left wheel speed Vwfl from front-left wheel speed sensor 20 are read. Thereafter, the subroutine proceeds from step S60 to step S61.

At step S61, a check is made to determine whether the wheel speed value of front-right wheel speed Vwfr from front-right wheel speed sensor 21 is unequal to the wheel speed value of front-left wheel speed Vwfl from front-left wheel speed sensor 20. When the answer to step S61 is negative (Vwfr=Vwfl), the subroutine returns from step S61 to step S60. Vwfr=Vwfl means the vehicle's straight-ahead driving period. Conversely when the answer to step S61 is affirmative (Vwfr≠Vwfl), the subroutine advances from step S61 to step S62. Vwfr≠Vwfl means the vehicle's cornering period.

At step S62, a 4WD vehicle's turning radius R is calculated based on the wheel speed difference (exactly, the absolute value of the wheel speed difference (|Vwfr−Vwfl|=|Vwfl−Vwfr|=|ΔVw|) between front-left and front-right wheel speeds Vwfl and Vwfr. After step S62, step S63 occurs.

At step S63, tight-corner period delivered torque $T_{TIGHT}$ is calculated based on accelerator opening Acc, engine speed Ne, and 4WD vehicle's turning radius R.

In the embodiment, the vehicle's turning radius R is calculated based on the left-and-right wheel-speed difference (|Vwfr−Vwfl|=|Vwfl−Vwfr|=|ΔVwfl) of front road wheels 15 and 16. Instead of using the front-left-and-front-right wheel-speed difference (|Vwfr−Vwfl|=|Vwfl−Vwfr|=|ΔVwfl) of the front road wheels, 4WD vehicle's turning radius R may be calculated or estimated based on the rear-left-and-rear-right wheel-speed difference (|Vwrr−Vwrl|=|Vwrl−Vwrr|=|ΔVwr|) of rear road wheels 7 and 8.

To take a concrete example of a 4WD vehicle's operating mode in which (i) the previously-noted noise (and vibrations) and (ii) the tight-corner braking phenomenon occur on turns, let us look at the case of a particular starting period that the 4WD vehicle starts from the stand-still state and simultaneously rounds a curve. As hereunder described in detail, during such a particular starting period, the front wheel torque characteristic curve of wheel torque characteristic curves tends to fluctuate positively and negatively depending on the presence or absence of the countermeasure-of-noise control and on the presence or absence of the tight-corner braking phenomenon prevention control.

Figure 7A:
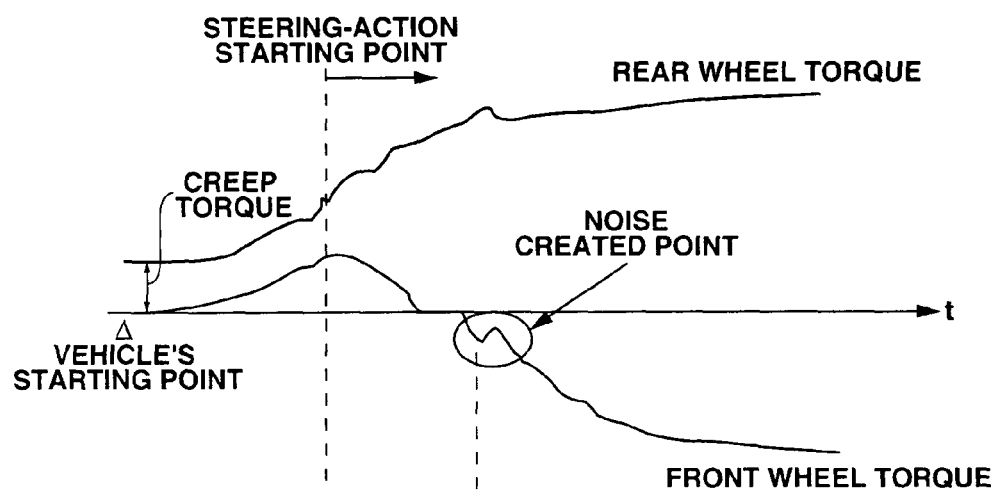
FIGS. 7A and 7B are time charts respectively showing (i) characteristic curves of a rear wheel torque and a front wheel torque, and (ii) a characteristic curve of a coupling command torque, when the 4WD vehicle starts from the stand-still state and simultaneously rounds a curve, with no countermeasure of noise (with no noise prevention control) and with no countermeasure of tight-corner braking phenomenon (with no tight-corner braking phenomenon prevention control).
Figure 7B:
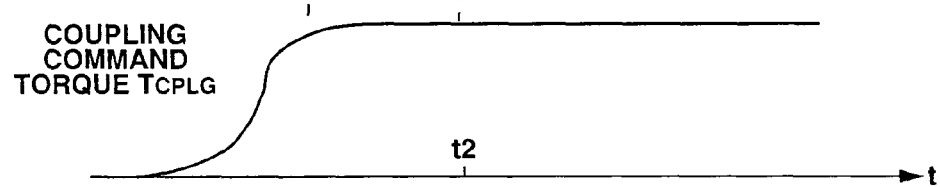

FIGS. 7A–7B show the case that the countermeasure of noise (and vibrations) and the countermeasure of tight-corner braking phenomenon are not taken. As shown in FIG. 7B, coupling command torque $T_{CPLG}$ gradually rises toward a desired torque value (corresponding to normal-control delivered torque $T_{CPLG-NORMAL}$) after the 4WD vehicle starts from the stand-still state. As shown in FIGS. 7A–7B, when the front wheels are steered at a point of time when coupling command torque $T_{CPLG}$ has risen adequately in order to ensure a sufficient traction performance during the 4WD vehicle's starting period, the average value (Vwfl+Vwfr)/2 of front-left and front-right wheel speeds Vwfl and Vwfr becomes greater than or equal to the average value (Vwrl+Vwrr)/2 of rear-left and rear-right wheel speeds Vwrl and Vwrr, because of the turning-radius difference between the front and rear road wheels. The front wheel torque, which has been gradually risen during the 4WD vehicle's straight-ahead driving from the vehicle's starting point, begins to drop just after the beginning of steering action. At this time, due to the comparatively great input torque (twisting moment or torsional torque) acting on the cam mechanism (32, 33, 34) incorporated in coupling 10 during the straight-ahead driving period before the steer-action starting point, ball 34, cam surface 32a of pilot cam 32, and cam surface 33a of main cam 33 deform elastically and thus the cam mechanism is still conditioned in a state (see FIG. 3B) that ball 34 has bit into and stuck fast to each of cam surface 32a and cam surface 33a. After this, due to the steering action or the 4WD vehicle's turn, the input direction of torque inputted into coupling 10 is reversed with respect to the input direction of torque inputted into coupling 10 during the straight-ahead driving period. Thereafter, when the magnitude of input torque transferred from the secondary drive wheels (front-left and front-right road wheels 15 and 16) into coupling 10 exceeds the magnitude of input torque transferred from engine 1 via transmission 2 into coupling 10, the front wheel torque remains held at a zero torque level for a brief moment owing to ball 34 bit and stuck between cam surface 32a of pilot cam 32 and cam surface 33a of main cam 33. With the lapse of time, at the time t2, pilot cam 32, ball 34, and main cam 33, which are bit into and stuck fast together, are momentarily rapidly separated from each other, since the state of reversal-of-torque continues. Such a momentary release of coupling 10, in other words, such a rapid reactionary uncoupling motion of coupling 10, results in positive and negative torque fluctuations of the front wheel torque, thus causing unwanted collisional noise and undesired vibrations. Thereafter, due to a further drop in the front wheel torque, as a matter of course, the negative front wheel torque develops, and thus a negative driving torque, in other words, a braking torque acts on the drive train (the power train). The lower the front wheel torque drops within a negative front-wheel-torque range, the greater the magnitude of the braking torque (the negative driving torque) acting on the drive train. In this manner, the tight-corner braking phenomenon takes place after the occurrence of the previously-noted noise (and vibrations) created within coupling 10.

Figure 8A:
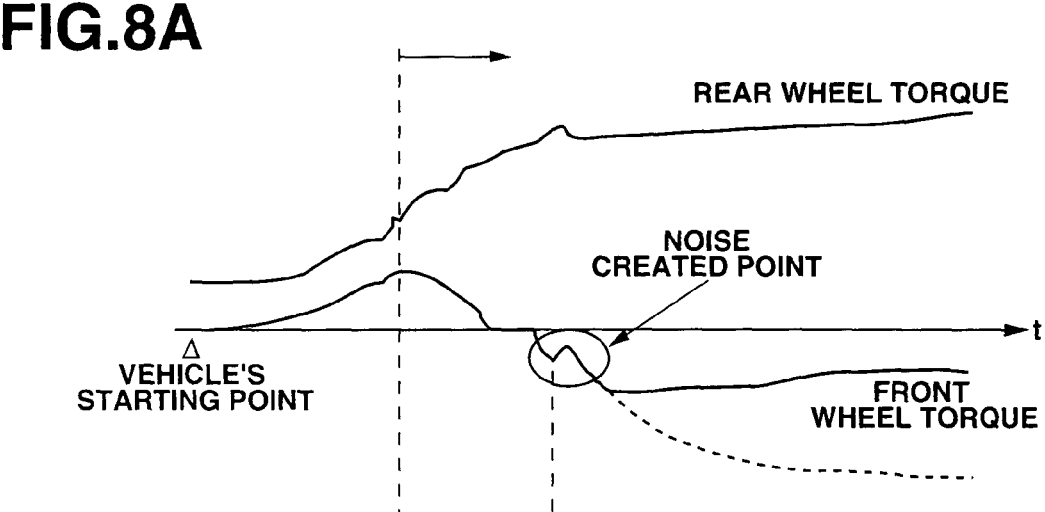
FIGS. 8A–8B are time charts respectively showing (i) characteristic curves of rear and front wheel torques, and (ii) a characteristic curve of a coupling command torque, when the 4WD vehicle starts from the stand-still state and simultaneously rounds a curve, without noise prevention control and with tight-corner braking phenomenon prevention control.
Figure 8B:
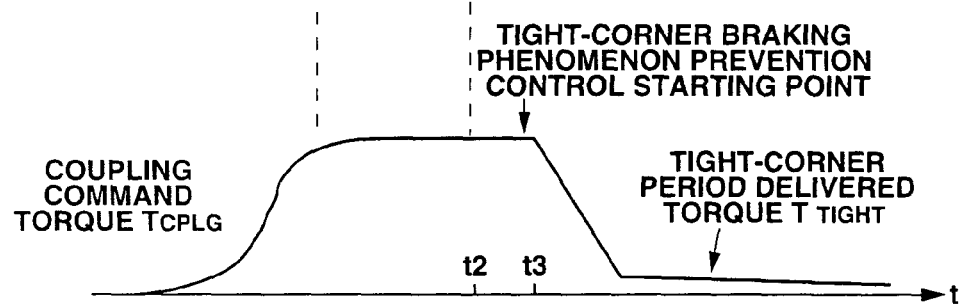

FIGS. 8A–8B show the case that only the countermeasure of tight-corner braking phenomenon is taken. As can be appreciated from comparison between the characteristic curves shown in FIGS. 7A–7B (with no noise prevention control and with no tight-corner braking phenomenon prevention control) and FIGS. 8A–8B (with only the tight-corner braking phenomenon prevention control), during a period of time from the 4WD vehicle's starting point and the time t2, the characteristics of the rear wheel torque, the front wheel torque, and coupling command torque $T_{CPLG}$ shown in FIGS. 8A–8B are the same as those of FIGS. 7A–7B. That is to say, in a similar manner to the system not having the noise prevention control function and tight-corner braking phenomenon prevention control function (see FIGS. 7A–7B), the system with only the tight-corner braking phenomenon prevention control function (see FIGS. 8A–8B) experiences the rapid reactionary uncoupling action of coupling 10, in other words, undesired positive and negative front-wheel-torque fluctuations at the time t2 owing to the reversal of torque. Therefore, even in the case of the system having only the tight-corner braking phenomenon prevention control function (see FIGS. 8A–8B), unwanted collisional noise and undesired vibrations arise from the rapid reactionary uncoupling action (undesired positive and negative front-wheel-torque fluctuations occurring at the time t2) at the early stage of the 4WD vehicle's turn. Thereafter, when the front wheel torque further drops from the time point t2 and becomes less than a predetermined threshold value, the tight-corner braking phenomenon prevention control function is engaged or initiated (see the time t3 of FIGS. 8A–8B). From the point of time t3, according to the tight-corner braking phenomenon prevention control, coupling command torque $T_{CPLG}$ reduces down to a predetermined torque value (corresponding to tight-corner period delivered torque $T_{TIGHT}$). As a result of this, after the time t3, the drop in the front wheel torque is suppressed, and thus the system having only the tight-corner braking phenomenon prevention control function (see FIGS. 8A–8B) exhibits the front wheel torque characteristic having a slightly negative torque value (see the change in the front wheel torque from t3 in FIG. 8A). As a consequence, only the tight-corner braking phenomenon can be suppressed or prevented. However, as can be seen from the positive and negative front-wheel-torque fluctuations shown in FIG. 8A, it is impossible or difficult to prevent the previously-discussed noise (and vibrations) from occurring owing to the reversal of input direction of torque inputted into the front wheels, by way of the tight-corner braking phenomenon prevention control executed for the countermeasure of tight-corner braking phenomenon.

Figure 9A:
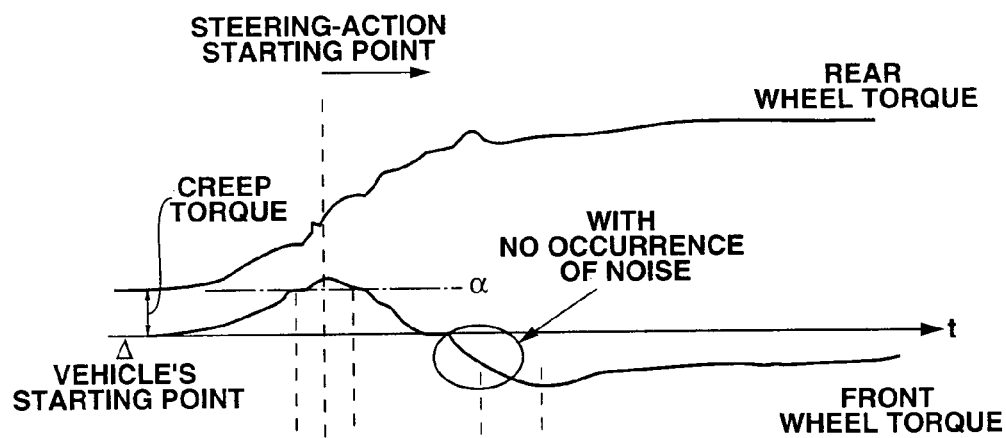
FIGS. 9A–9B are time charts respectively showing (i) characteristic curves of rear and front wheel torques, and (ii) a characteristic curve of a coupling command torque, when the 4WD vehicle starts from the stand-still state and simultaneously rounds a curve, with both of noise prevention control and tight-corner braking phenomenon prevention control.
Figure 9B:
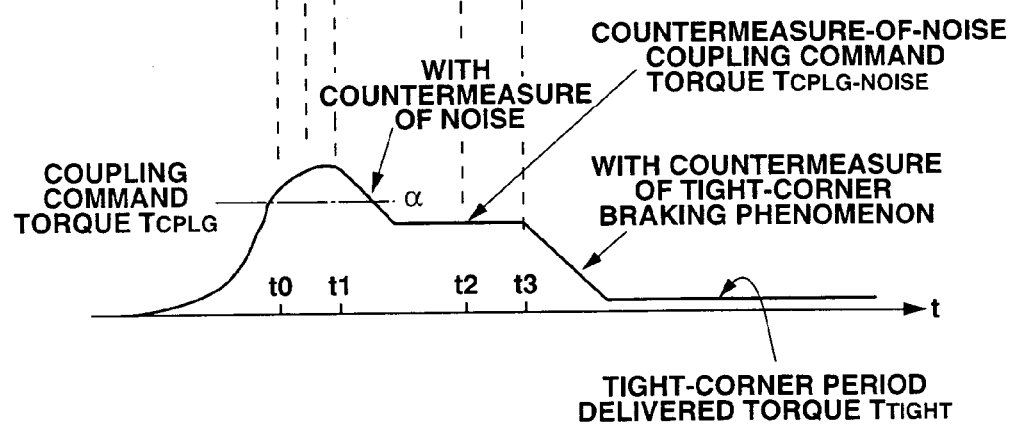

FIGS. 9A–9B show the case of the system of the first embodiment taking into account both of the countermeasure of noise and the countermeasure of tight-corner braking phenomenon. As shown in FIG. 9B, in order to ensure a sufficient traction performance during the vehicle's starting period, coupling command torque $T_{CPLG}$ gradually rises toward a desired torque value (corresponding to normal-control delivered torque $T_{CPLG-NORMAL}$) after the 4WD vehicle starts from the stand-still state. Thereafter, coupling command torque $T_{CPLG}$ reaches predetermined threshold value $\alpha$ and thus the coupling-command-torque $T_{CPLG}$ condition ($T_{CPLG} \geq \alpha$) of step S47 is satisfied and also past-record torque $T_{REC(n)}$ reaches predetermined threshold value $\alpha$ and thus the past-record-torque $T_{REC}$ condition ($T_{REC(n)} \geq \alpha$) of step S48 is satisfied at the time t0. After t0, when the front wheels are steered with coupling command torque $T_{CPLG}$ risen adequately, the average value (Vwfl+Vwfr)/2 of front-left and front-right wheel speeds Vwfl and Vwfr becomes greater than or equal to the average value (Vwrl+Vwrr)/2 of rear-left and rear-right wheel speeds Vwrl and Vwrr, because of the turning-radius difference between the front and rear road wheels. The front wheel torque, gradually risen during the vehicle's straight-ahead driving from the vehicle's starting point, begins to drop just after the beginning of steering action. After this, the first condition (the coupling-command-torque $T_{CPLG}$ condition) defined by the inequality $T_{CPLG} \geq \alpha$ (see step S47), and the third condition (the reversal-of-torque condition) that the reversal of input direction of torque inputted into coupling 10 is present (see step S49) are both satisfied at the time t1. In such a case, the routine of FIG. 4A flows from step S40 through steps S41, S44, S45, (S46), S47, S48, S49, S50, and S51 to S52. Therefore, 4WD controller 17 outputs a solenoid driving current corresponding to countermeasure-of-noise coupling command torque $T_{CPLG-NOISE}$ calculated through step S50 to electronic solenoid 26 of coupling 10. As set out above, by way of the output of the solenoid driving current corresponding to countermeasure-of-noise coupling command torque $T_{CPLG-NOISE}$, which is set to be lower than predetermined threshold value $\alpha$ so as to effectively reduce the coupling command torque value, in other words, by timely reducing the force of engagement of coupling 10 just after t1, there is a transition from the state (see FIG. 3B) that ball 34 has bit into and stuck fast to each of cam surface 32a and cam surface 33a due to elastic deformation to the uncoupled state (see FIG. 3C) that the aperture defined between cam surface 32a and cam surface 33a is enlarged and thus pilot cam 32, ball 34, and main cam 33 are separated from each other. Timely reducing the coupling command torque value down to countermeasure-of-noise coupling command torque $T_{CPLG-NOISE}$ just after t1, ball 34, which is jammed between pilot cam 32 and main cam 33, is effectively released or disengaged from the relatively-rotatable friction-contact members, namely cams 32 and 33, during a period of time from t1 and t2. Thus, it is possible to prevent the previously-noted noise (and vibrations) from being created in coupling 10 at t2, before it happens. Hereupon, the aperture defined between cam surfaces 32a and 33a can be held constant except that the current value of the solenoid driving current corresponding to countermeasure-of-noise coupling command torque $T_{CPLG-NOISE}$ changes. Thereafter, when the front wheel torque further drops from the time point t2 and becomes less than the predetermined threshold value, the tight-corner braking phenomenon prevention control function is engaged (see the time t3 of FIGS. 9A–9B). From the point of time t3 (see FIG. 9B), in accordance with the tight-corner braking phenomenon prevention control, coupling command torque $T_{CPLG}$ further reduces down to the predetermined torque value (corresponding to tight-corner period delivered torque $T_{TIGHT}$), since 4WD controller 17 outputs a solenoid driving current corresponding to select-LOW torque $T_{SL2}$(=MIN($T_{CPLG-NOISE}$, $T_{TIGHT}$) and additionally tight-corner period delivered torque $T_{TIGHT}$ is set to be lower than countermeasure-of-noise coupling command torque $T_{CPLG-NOISE}$ (i.e., $T_{TIGHT} < T_{CPLG-NOISE}$). As discussed above, by way of the output of the solenoid driving current corresponding to tight-corner period delivered torque $T_{TIGHT}$, which is set to be lower than countermeasure-of-noise coupling command torque $T_{CPLG-NOISE}$ and corresponds to a substantially uncoupled state of coupling 10 (a substantially disengaged state of the friction clutch), in other words, by further reducing the force of engagement of coupling 10 just after t3, the drop in the front wheel torque is further suppressed from the time t3. Thus, the system of the first embodiment having both of the noise prevention control function and the tight-corner braking phenomenon prevention control function (see FIGS. 9A–9B) exhibits the front wheel torque characteristic having a slightly negative torque value (see the change in the front wheel torque from t3 in FIG. 9A). As set forth above, according to the system of the first embodiment, (i) undesired noise and vibrations, which may occur at the early stage of the 4WD vehicle's turn, and (ii) the tight-corner braking phenomenon, which may occur at the intermediate and last stages of the 4WD vehicle's turn, can be all suppressed or prevented.

As discussed above, (i) the previously-noted "noise and vibrations", and (ii) the "tight-corner braking phenomenon" are phenomena occurring on turns of 4WD vehicles. As explained previously, these two phenomena can be suppressed, prevented or avoided by properly reducing coupling command torque $T_{CPLG}$. However, exactly speaking, these two phenomena unique to 4WD vehicles are remarkably different from each other, as hereunder described in detail.

The "tight-corner braking phenomenon" corresponds to a phenomenon arising from a braking torque acting on the drive train owing to insufficient absorption of the front-and-rear wheel-speed difference, in other words, the front-and-rear turning-radius difference, when a four-wheel-drive vehicle, in particular, a non-center-differential equipped 4WD vehicle goes around a tight corner whose radius of curvature is comparatively small in a four-wheel-drive mode. On non-center-differential equipped 4WD vehicles, the "tight-corner braking phenomenon" is more remarkable than center-differential equipped 4WD vehicles, since the front-and-rear wheel-speed difference can be absorbed by the center differential. Thus, the "tight-corner braking phenomenon" takes place during turns irrespective of whether the 4WD vehicle is moving backward or forward, and also takes place during turns irrespective of whether a basic drive mode of a 4WD vehicle is a rear-wheel-drive mode or a front-wheel-drive mode. On the contrary, the occurrence of the previously-noted "noise and vibrations" are limited to particular cases that the secondary drive wheel rotates faster than the primary drive wheel and thus the "reversal of torque" takes place. That is, the previously-noted "noise and vibrations" occur when a basic wheel drive mode of a 4WD vehicle is a rear-wheel-drive mode and the 4WD is moving forward, while rounding a curve, and when a basic wheel drive mode of a 4WD vehicle is a front-wheel-drive mode and the 4WD is moving backward, while rounding a curve.

The "tight-corner braking phenomenon" takes place when the 4WD vehicle rounds a tight corner whose radius of curvature is comparatively small. The "tight-corner braking phenomenon" occurs at the intermediate or last stages of the 4WD vehicle's turn that the negative secondary drive wheel torque greatly develops. On the contrary, the previously-noted "noise and vibrations" occur irrespective of the magnitude of the turning radius during turns, when a comparatively great input torque (a comparatively great twisting moment or torsional torque) has been applied to the electronically-controlled coupling (the friction clutch), and then reversal of input direction of torque applied to the coupling (the friction clutch) takes place. The previously-noted "noise and vibrations" occur at the early stage of the 4WD vehicle's turn that the value of input torque applied to the secondary drive wheels changes from positive to negative.

In taking a countermeasure against the "tight-corner braking phenomenon", first, 4WD controller 17 has to detect whether or not the 4WD vehicle rounds a tight corner. Concretely, in the system of the embodiment, the tight-corner check is based on turning radius R (see step S62 of FIG. 4B). When turning radius R is below the predetermined threshold value, 4WD controller 17 determines that the 4WD vehicle rounds a tight corner, and thus the coupling command torque is reduced down to tight-corner period delivered torque $T_{TIGHT}$, which is set to be lower than countermeasure-of-noise coupling command torque $T_{CPLG\text{-}NOISE}$ and corresponds to a substantially uncoupled state of coupling 10. Briefly speaking, the countermeasure against the "tight-corner braking phenomenon" is achieved by fully or almost uncoupling (or disengaging) coupling 10. On the contrary, in taking a countermeasure against the previously-noted "noise and vibrations", first, 4WD controller 17 has to detect the presence or absence of reversal of input direction of torque applied to coupling 10. Concretely, in the system of the first embodiment, the reversal of input direction of torque applied to coupling 10 is based on a comparison result between wheel-speed difference |ΔVw| between front-left and front-right wheel speeds and predetermined reversal-of-torque criterion $\Delta V w_0$. When 4WD controller 17 determines that the "reversal of torque" occurs in a state that ball 34 has bit into and stuck fast to each of cam surface 32a and cam surface 33a (see FIG. 3B) due to the twisting moment or torsional torque, 4WD controller 17 functions to reduce the coupling command torque down to countermeasure-of-noise coupling command torque $T_{CPLG\text{-}NOISE}$, in order to effectively release or disengage ball 34, jammed between pilot cam 32 and main cam 33, from the relatively-rotatable friction-contact members, namely cams 32 and 33. Countermeasure-of-noise coupling command torque $T_{CPLG\text{-}NOISE}$ is set to a torque level obtained by multiplying the current coupling command torque $T_{CPLG}$ with a predetermined reduction rate β such as 0.8, from an expression $T_{CPLG\text{-}NOISE} = \beta \times T_{CPLG} = 0.8 \times T_{CPLG}$. That is to say, the countermeasure against the previously-noted "noise and vibrations" is achieved by reducing the coupling command torque to the torque level ($T_{CPLG\text{-}NOISE}$) below which ball 34, jammed between pilot cam 32 and main cam 33, can be released or disengaged from the relatively-rotatable friction-contact members, namely cams 32 and 33.

The driving-force distribution control system of the first embodiment shown in FIGS. 1, 4A–4B, and 6A–6B has the following effects (I)–(VI).

(I) In the driving-force distribution control system for the four-wheel-drive vehicle with electronically-controlled coupling 10 through which driving torque (driving force), produced by engine 1 (a driving power source) and transmitted to transmission 2, is delivered to primary drive wheels (rear wheels 7 and 8) and to secondary drive wheels (front wheels 15 and 16) at a desired distribution ratio based on a vehicle's operating condition, the system of the first embodiment includes (a) a torque threshold value setting section (corresponding to step S40) that sets a lower limit torque, above which noise and vibrations take place within the friction clutch (coupling 10) when the input direction of torque inputted into the friction clutch is reversed, as a predetermined torque threshold value α, (b) a coupling-input-torque $T_{CPin}$ past-history condition decision step (corresponding to step S48) that determines whether a past-history condition defined by the inequality $T_{CPin} \geq \alpha$ (or $T_{REC} \geq \alpha$) has been satisfied when coupling command torque $T_{CPLG}$ for electronically-controlled coupling 10 is greater than or equal to predetermined torque threshold value α during a time period from a time when coupling command torque $T_{CPLG}$ begins to rise from a zero toque level to a current execution cycle of the driving-force distribution control system, (c) a coupling-command-torque $T_{CPLG}$ condition decision step (corresponding to step S47) that determines whether the current value of coupling command torque $T_{CPLG}$ is greater than or equal to predetermined threshold value α and thus a coupling-command-torque condition defined by the inequality $T_{CPLG} \geq \alpha$ is satisfied, (d) a reversal-of-torque condition decision step (corresponding to step S49) that determines whether a reversal-of-torque condition that the input direction of torque inputted into coupling 10 is reversed is satisfied, (e) a countermeasure-of-noise coupling command torque $T_{CPLG\text{-}NOISE}$ calculation step (corresponding to step S50) that calculates a countermeasure-of-noise coupling command torque $T_{CPLG\text{-}NOISE}$ obtained by decreasingly compensating for the current value of coupling command torque $T_{CPLG}$ when the past-history condition, the coupling-command-torque condition, and the reversal-of-torque condition are all satisfied, and (f) a coupling command torque control step (corresponding to step S52) that outputs a command signal corresponding to the calculated countermeasure-of-noise coupling command torque $T_{CPLG\text{-}NOISE}$ to electronically-controlled coupling 10. Therefore, according to the system of the first embodiment, it is possible to prevent the previously-noted noise and vibrations which may occur within coupling 10 (friction clutch) when ball 43 of the cam mechanism of coupling 10, jammed between pilot cam 32 and main cam 33 due to the twisting moment or torsional torque, is momentarily rapidly released or disengaged from the relatively-rotatable friction-contact members, namely cams 32 and 33, before it happens.

(II) According to the countermeasure-of-noise coupling command torque $T_{CPLG\text{-}NOISE}$ calculation step S50, countermeasure-of-noise coupling command torque $T_{CPLG\text{-}NOISE}$ is calculated such that the decrement, that is, the deviation (|$T_{CPLG\text{-}NOISE} - T_{CPLG}$|) of countermeasure-of-noise coupling command torque $T_{CPLG\text{-}NOISE}$ from the current coupling command torque $T_{CPLG}$ increases, as the magnitude of the current coupling command torque $T_{CPLG}$ increases. Thus, even in a state that ball 43 has bit into and stuck fast to each of relatively-rotatable friction-contact members, namely cams 32 and 33, within the cam mechanism of coupling 10, it is possible to certainly effectively release or disengage ball 34, jammed between pilot cam 32 and main cam 33, from the relatively-rotatable friction-contact members 32 and 33.

(III) According to a torque threshold value α setting step (corresponding to step S40), predetermined torque threshold value α is set so that predetermined torque threshold value α gradually increases, as road-surface friction coefficient μ increases. Therefore, during a turn on a high-μ road having a high road-surface friction coefficient, during which a torque level of input torque transferred from the secondary drive wheels (front road wheels 15 and 16) into coupling 10 is relatively high and additionally a rate of change in the input torque is high, it is possible to quickly initiate the noise prevention control (or the countermeasure-of-noise control).

(IV) The system of the first embodiment also includes a tight-corner period delivered torque $T_{TIGHT}$ calculation section (a tight-corner period delivered torque $T_{TIGHT}$ calculation means corresponding to step S63) that calculates tight-corner period delivered torque $T_{TIGHT}$ based on accelerator opening Acc, engine speed Ne, and 4WD vehicle's turning radius R, and properly reduced to a torque level suitable to prevent the "tight-corner braking phenomenon" when the 4WD vehicle rounds a tight corner, and a select-LOW processing step (see step S51) that selects a lower one $T_{SL2}$ of countermeasure-of-noise coupling command torque $T_{CPLG\text{-}NOISE}$ and tight-corner period delivered torque $T_{TIGHT}$. Actually, the coupling command torque control step S52 functions to output a command signal corresponding to select-LOW torque $T_{SL2}$ obtained by way of select-LOW process $MIN(T_{CPLG\text{-}NOISE}, T_{TIGHT})$ to electronically-controlled coupling 10. Thus, it is possible to prevent, in advance, the previously-noted "noise and vibrations" which may occur in the cam mechanism of coupling 10 during turns, and to also prevent the occurrence of the "tight-corner braking phenomenon" during turns.

(V) In addition to the above, the friction clutch of the transfer of the 4WD vehicle is constructed by an electronically-controlled coupling 10, which is comprised of electromagnetic solenoid 26, armature 30, pilot clutch 31, pilot cam 32, main cam 33, ball 34, and main clutch 35, and a friction torque, produced in pilot clutch 31 by way of an electromagnetic force, is transmitted to pilot cam 32, and torque, transmitted into pilot cam 32, is further multiplied and converted into an axial torque acting in the axial direction of clutch input shaft 27 via ball 34 placed between cam grooves 32a and 33a, and the axial torque multiplied forces main cam 33 axially against main clutch 35 so as to produce a friction torque whose magnitude is proportional to the magnitude of a solenoid driving current applied to the electromagnetic solenoid 26, by forcing main cam 33 axially against main clutch 35. Thus, it is possible to prevent, in advance, the previously-noted "noise and vibrations" which may occur pilot cam 32, ball 34, and main cam 33, which are bit into and stuck fast together, are momentarily rapidly separated from each other owing to reversal of input direction of torque applied to coupling 10.

(VI) Moreover, according to the system of the first embodiment that executes the routine of FIG. 4A, 4WD controller 17 determines that the input direction of torque applied to coupling 10 has been reversed when the absolute value $|\Delta Vw|(=|Vwfl-Vwfr|)$ of the wheel speed difference between front-left and front-right wheel speeds Vwfl and Vwfr becomes greater than or equal to a predetermined reversal-of-torque criterion $\Delta Vw_0$. Thus, it is possible to accurately determine the presence of absence of reversal of input direction of torque applied to electronically-controlled coupling 10, utilizing the existing front wheel speed sensors 20 and 21 used in the ABS control system.

Figure 10:
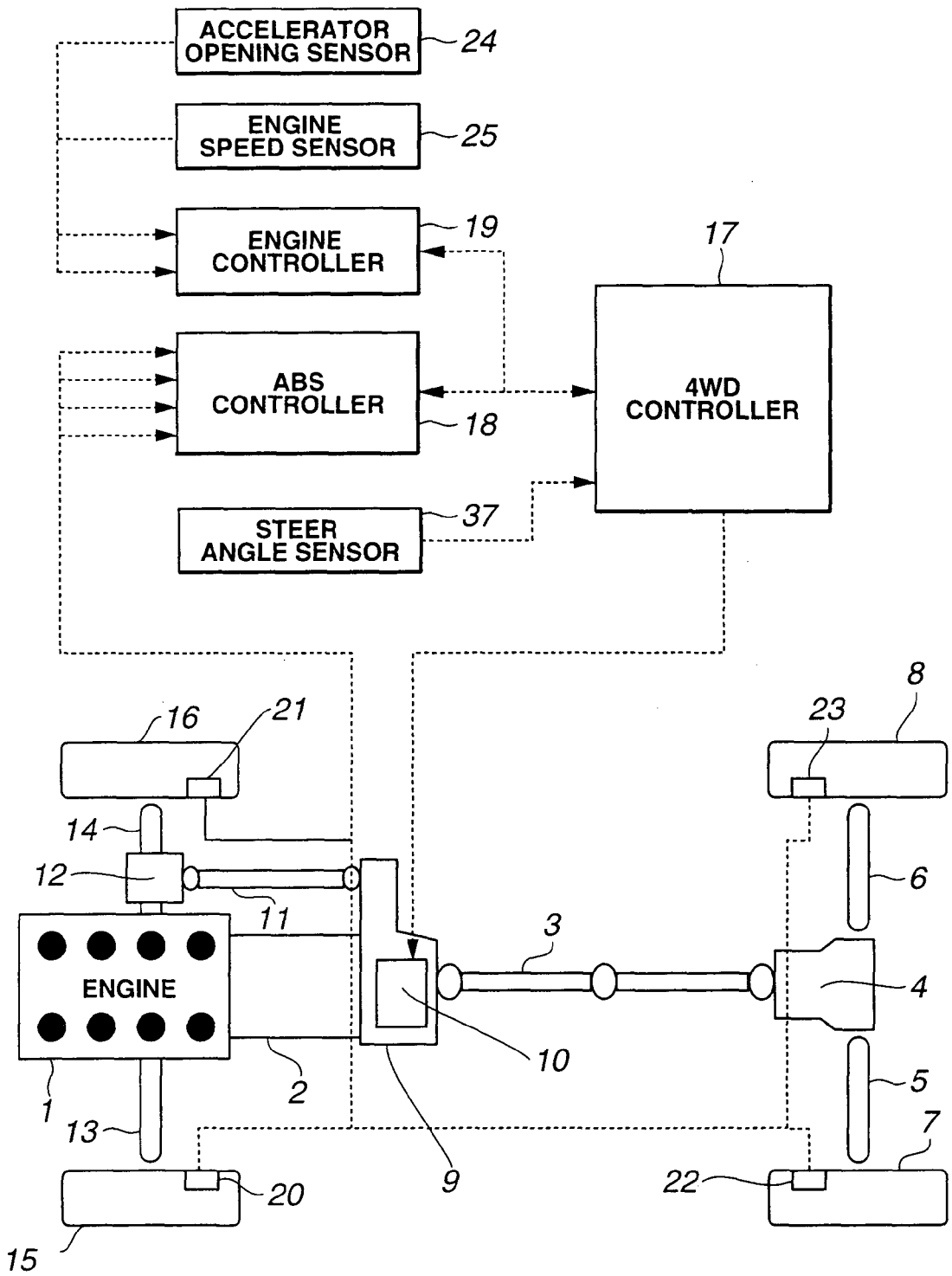
FIG. 10 is a system block diagram illustrating a second embodiment of a driving-force distribution control system for a 4WD vehicle.
Figure 11A:
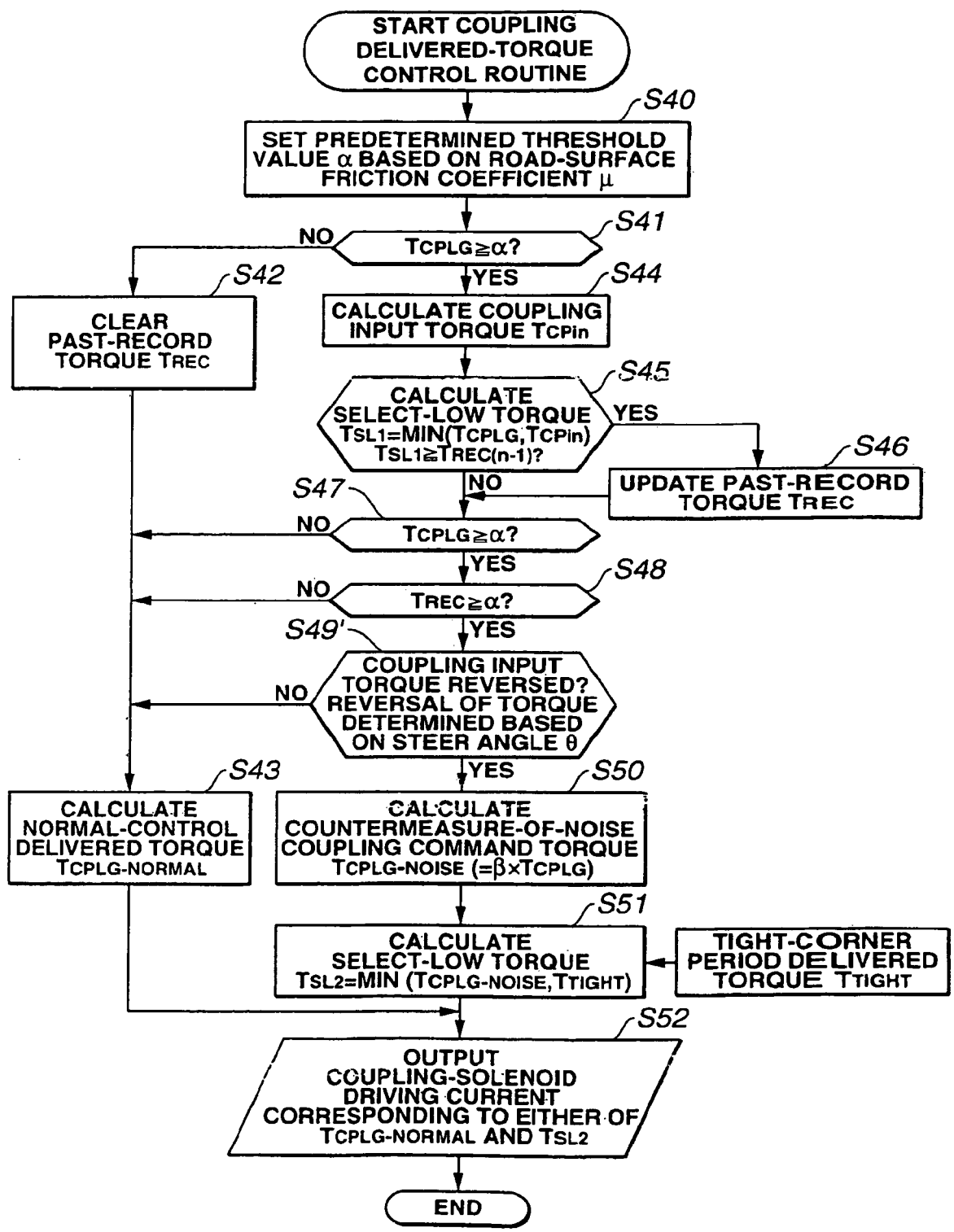
FIG. 11A is a flow chart showing a coupling delivered-torque control routine, executed within a 4WD controller included in the driving-force distribution control system of the second embodiment.
Figure 11B:
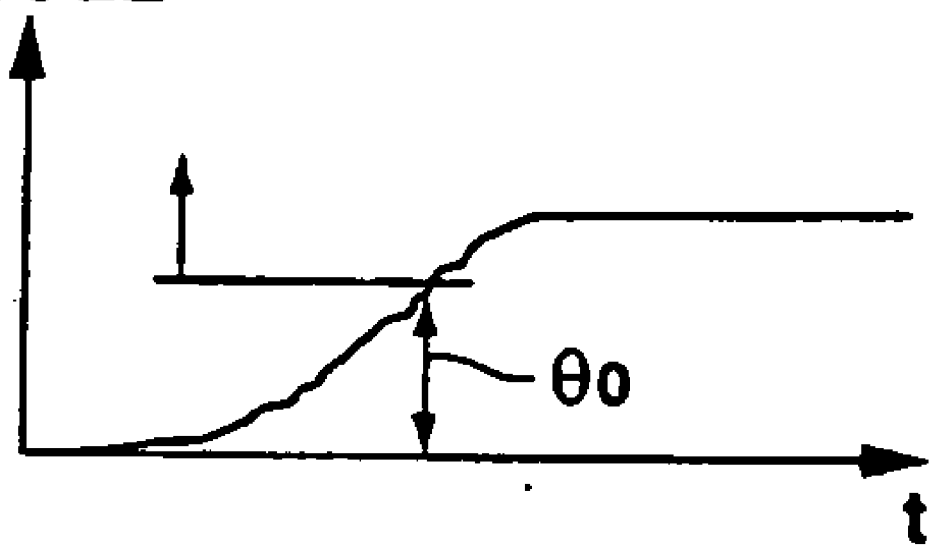
FIG. 11B is a characteristic diagram showing variations of a steer angle θ and a predetermined reversal-of-torque criterion steer angle $\theta_0$ (related to step S49' of FIG. 11A).

FIGS. 10, 11A, and 11B show the driving-force distribution control system of the second embodiment.

As clearly shown in FIG. 10, a steer angle sensor 37 is added to determine the presence or absence of reversal of torque applied to the secondary drive wheel. That is, for the purpose of a decision of the presence or absence of reversal of torque applied to the secondary drive wheel, the system of the second embodiment uses a sensor signal (indicative of a steer angle θ) from steer angle sensor 37, instead of using the wheel-speed difference $|\Delta Vw|$ between front-left and front-right wheel speeds Vwfl and Vwfr.

Referring now to FIG. 11A, there is shown a modified arithmetic processing executed within 4WD controller 17 included in the driving-force distribution control system of the second embodiment. The modified arithmetic processing shown in FIG. 11A is also executed as time-triggered interrupt routines to be triggered every predetermined time intervals such as 10 milliseconds. The modified arithmetic processing of FIG. 11A is similar to the arithmetic processing of FIG. 4A, except that step S49 included in the routine shown in FIG. 4A is replaced with step S49' included in the routine shown in FIG. 11A. Thus, the same step numbers used to designate steps in the routine shown in FIG. 4A will be applied to the corresponding step numbers used in the modified arithmetic processing shown in FIG. 11A, for the purpose of comparison of the two different interrupt routines. Step S49' will be hereinafter described in detail with reference to the accompanying drawings, while detailed description of steps S40–S48, and S50–S52 will be omitted because the above description thereon seems to be self-explanatory.

At step S49' of FIG. 11A, a check is made to determine, based on steer angle θ, whether the input direction of torque inputted into coupling 10 is reversed. Actually, in the system of the second embodiment shown in FIGS. 10 and 11A–11B, the presence or absence of reversal of input direction of torque flow into coupling 10, in other words, the presence or absence of reversal of torque applied to the secondary drive wheel, is determined depending on whether steer angle θ is greater than or equal to a predetermined reversal-of-torque criterion $\Delta\theta_0$ (see FIG. 11B). When the answer to step S49' is in the affirmative (YES), the routine proceeds from step S49' to step S50. Conversely when the answer to step S49' is in the negative (NO), the routine proceeds from step S49' to step S43.

The driving-force distribution control system of the second embodiment shown in FIGS. 10, and 11A–11B has the following effect (VII) in addition to the same effects (I)–(V) as the first embodiment.

(VII) According to the system of the second embodiment that executes the routine of FIG. 11A, 4WD controller 17 determines that the input direction of torque applied to coupling 10 has been reversed when steer angle θ becomes greater than or equal to a predetermined reversal-of-torque criterion $\Delta\theta_0$, that is, $\theta \geq \Delta\theta_0$, (see step S49' of FIG. 11A). Thus, it is possible to accurately determine the presence of absence of reversal of input direction of torque applied to electronically-controlled coupling 10, utilizing the existing steer angle sensor 37 used in a computer-controlled variable ratio steering system.

Figure 12:
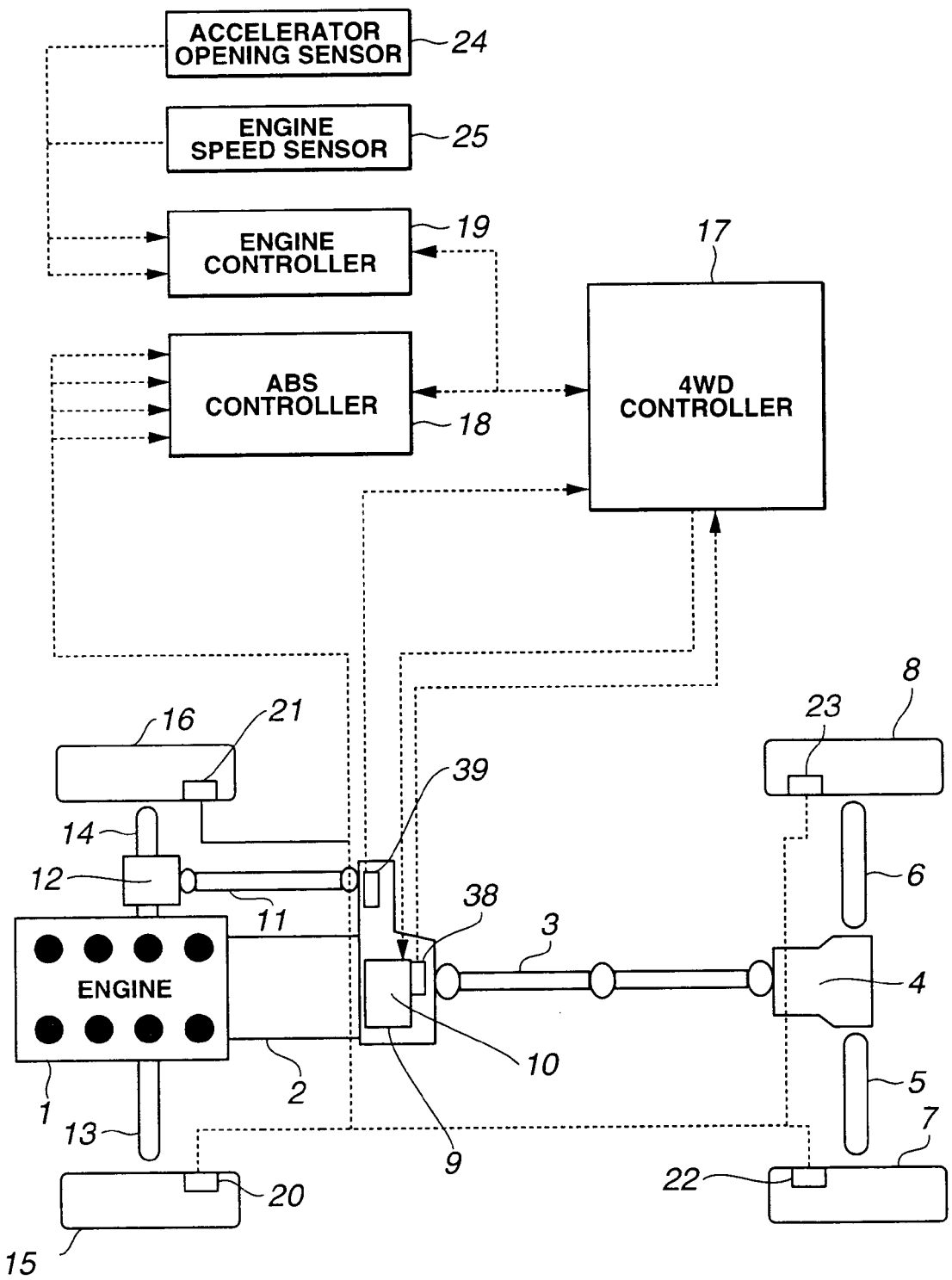
FIG. 12 is a system block diagram illustrating a third embodiment of a driving-force distribution control system for a 4WD vehicle.
Figure 13:
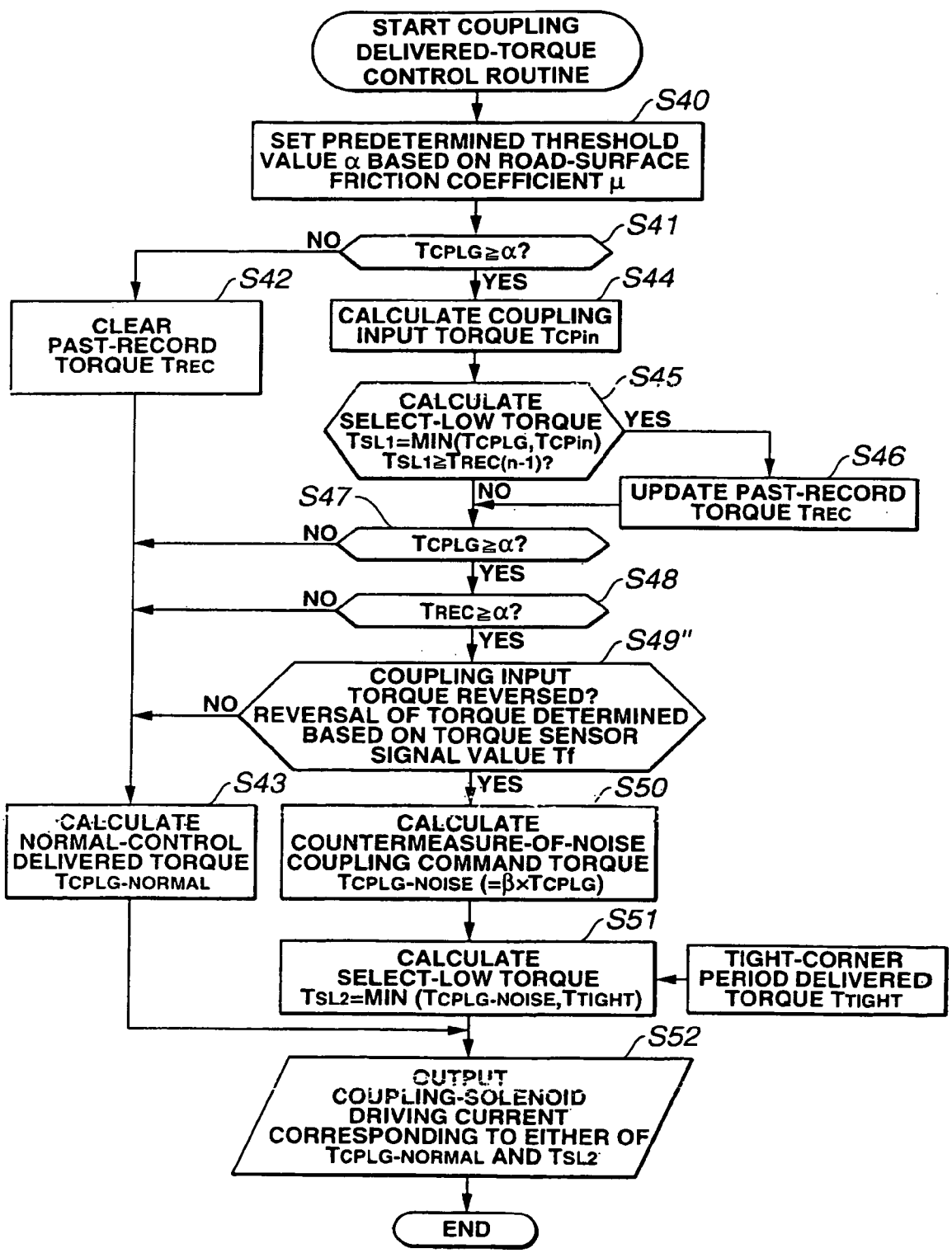
FIG. 13 is a flow chart showing a coupling delivered-torque control routine, executed within a 4WD controller included in the driving-force distribution control system of the third embodiment.

FIGS. 12 and 13 show the driving-force distribution control system of the third embodiment.

As clearly shown in FIG. 12, a rear wheel torque sensor 38 and a front wheel torque sensor 39 are added. For the purpose of a decision of the presence or absence of reversal of torque applied to the secondary drive wheel, the system of the third embodiment uses a sensor signal (indicative of a front wheel torque Tf) from front wheel torque sensor 39, instead of using the wheel-speed difference $|\Delta Vw|$ between front-left and front-right wheel speeds Vwfl and Vwfr. On the other hand, a sensor signal (indicative of a rear wheel torque Tr) from rear wheel torque sensor 38 is used to directly detect coupling input torque $T_{CPin}$, instead of estimating or calculating coupling input torque $T_{CPin}$ through step S44.

Referring now to FIG. 13, there is shown a modified arithmetic processing executed within 4WD controller 17 included in the driving-force distribution control system of the third embodiment. The modified arithmetic processing shown in FIG. 13 is also executed as time-triggered interrupt routines to be triggered every predetermined time intervals such as 10 milliseconds. The modified arithmetic processing of FIG. 13 is similar to the arithmetic processing of FIG. 4A, except that step S49 included in the routine shown in FIG. 4A is replaced with step S49'' included in the routine shown in FIG. 13. Thus, the same step numbers used to designate steps in the routine shown in FIG. 4A will be applied to the corresponding step numbers used in the modified arithmetic processing shown in FIG. 13, for the purpose of comparison of the two different interrupt routines. Step S49' will be hereinafter described in detail with reference to the accompanying drawings, while detailed description of steps S40–S48, and S50–S52 will be omitted because the above description thereon seems to be self-explanatory.

At step S49'' of FIG. 13, a check is made to determine, based on front wheel torque Tf, whether the input direction of torque inputted into coupling 10 is reversed. In the system of the third embodiment shown in FIGS. 12–13, the presence or absence of reversal of input direction of torque flow into coupling 10, in other words, the presence or absence of reversal of torque applied to the secondary drive wheel, is determined depending on whether an amount (|ΔTf|) of torque drop in front wheel torque Tf is greater than or equal to a predetermined reversal-of-torque criterion $\Delta Tf_0$. Instead of comparison (|ΔTf|≧$\Delta Tf_0$) between the amount (|ΔTf|) of torque drop in front wheel torque Tf and predetermined reversal-of-torque criterion torque-drop $\Delta Tf_0$, the presence or absence of reversal-of-torque may be determined depending on whether a time rate (|dTf/dt|) of decrease in front wheel torque Tf is greater than or equal to a predetermined reversal-of-torque criterion rate-of-decrease Tτ. When the answer to step S49' is in the affirmative (|dTf/dt|≧Tτ), the routine proceeds from step S49'' to step S50. Conversely when the answer to step S49'' is in the negative (|dTf/dt|<Tτ), the routine proceeds from step S49'' to step S43.

The driving-force distribution control system of the third embodiment shown in FIGS. 12 and 13 has the following effect (VIII) in addition to the same effects (I)–(V) as the first embodiment.

(VIII) According to the system of the third embodiment that executes the routine of FIG. 13, as can be appreciated from step S49'' of FIG. 13, 4WD controller 17 determines that the input direction of torque applied to coupling 10 has been reversed when the amount of torque drop in front wheel torque Tf becomes greater than or equal to predetermined reversal-of-torque criterion $\Delta Tf_0$ (that is, |ΔTf|≧$\Delta Tf_0$), or when the time rate of decrease in front wheel torque Tf becomes greater than or equal to predetermined reversal-of-torque criterion rate-of-decrease Tτ (that is, |dTf/dt|≧Tτ). In this manner, by way of the use of the wheel torque sensor value, directly detected by the secondary drive wheel torque sensor (front wheel torque sensor 39), it is possible to more accurately and quickly determine the presence of absence of reversal of input direction of torque applied to electronically-controlled coupling 10. Additionally, when the wheel torque sensor value, directly detected by the primary drive wheel torque sensor (rear wheel torque sensor 38) is used as information regarding coupling input torque $T_{CPin}$, it is possible to provide a more accurate information regarding coupling input torque $T_{CPin}$, as compared to using the estimated coupling input torque value (see estimation or calculation made at step S44).

In the first through third embodiments, the driving-force distribution control system is exemplified in a four-wheel-drive vehicle in which a distribution ratio of torque to be delivered to secondary drive wheels (front road wheels) to torque to be delivered to primary drive wheels (rear road wheels), is variably adjusted from 0:100% toward 50%:50% by varying the engagement force of the clutch, and whose basic wheel drive mode is a rear-wheel-drive mode in which the torque distribution ratio is 0:100%. As can be appreciated from the above, the fundamental concept (that is, countermeasure-of-noise control) of the invention can be applied to a four-wheel-drive vehicle in which a distribution ratio of torque to be delivered to secondary drive wheels (front road wheels) to torque to be delivered to primary drive wheels (rear road wheels), is variably adjusted from 100%:0 toward 50%:50% by varying the engagement force of the clutch, and whose basic wheel drive mode is a front-wheel-drive mode in which the torque distribution ratio is 100%:0. In four-wheel-drive vehicles whose basic wheel drive mode is a front-wheel-drive mode, the countermeasure-of-noise control is effectively executed when the secondary drive wheel (rear wheel) rotates faster than the primary drive wheel (front wheel), that is, when the 4WD is moving backward, while rounding a curve.

In the shown embodiments, electronically-controlled coupling 10 employing the cam mechanism (32, 33, 34) is exemplified as an electrically-controlled friction clutch (or an electronically-controlled transfer clutch). Alternatively, the fundamental concept (that is, countermeasure-of-noise control) of the invention can be applied to a four-wheel-drive vehicle employing a hydraulically-operated multiple disk clutch that serves as a torque distributing friction clutch hydraulically actuated in response to a controlled hydraulic pressure generated from an electronically-controlled hydraulic modulator incorporated in a 4WD controller as disclosed in Japanese Patent Provisional Publication No. 4-103433. In such a case, by virtue of the countermeasure-of-noise control, it is possible to avoid undesired noise and vibrations which may occur within the multiple disk clutch when the input direction of torque inputted into the multiple disk clutch is reversed and thus the multiple disk clutch momentarily shifts from its engaged state that several driving disks and several driven disks, alternately placed, are fitted and stuck fast together by way of a twisting moment to a disengaged state that the driving and driven disks are disengaged and separated from each other.

The entire contents of Japanese Patent Application No. 2002-280653 (filed Sep. 26, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A driving-force distribution control system for a four-wheel-drive vehicle comprising:
   a friction clutch through which a driving force produced by a driving power source is delivered to primary drive wheels and to secondary drive wheels at a distribution ratio based on an operating condition of the vehicle; and a four-wheel-drive vehicle controller configured to be electronically connected to the friction clutch for automatically controlling the distribution ratio, the four-wheel-drive vehicle controller comprising:

(a) a torque threshold value setting section that sets a lower limit torque, above which noise and vibrations take place within the friction clutch when an input direction of torque inputted into the friction clutch is reversed, as a predetermined torque threshold value;

(b) an input-torque past-history condition decision section that determines whether a past-history condition that a clutch input torque has been greater than or equal to the predetermined torque threshold value is satisfied when a command torque for the friction clutch is greater than or equal to the predetermined torque threshold value during a time period from a time when the command torque begins to rise from a zero torque level to a current execution cycle of the driving-force distribution control system;

(c) a command torque condition decision section that determines whether a command torque condition that a current value of the command torque, produced at the current execution cycle, is greater than or equal to the predetermined torque threshold value is satisfied;

(d) a reversal-of-torque condition decision section that determines whether a reversal-of-torque condition that an input direction of torque inputted into the friction clutch is reversed is satisfied;

(e) a countermeasure-of-noise command torque calculation section that calculates a countermeasure-of-noise command torque obtained by decreasingly compensating for the current value of the command torque when the past-history condition, the command torque condition, and the reversal-of-torque condition are all satisfied; and (f) a clutch command torque control section that outputs a command signal corresponding to the countermeasure-of-noise command torque to the friction clutch, when the past-history condition, the command torque condition, and the reversal-of-torque condition are all satisfied.

2. The driving-force distribution control system as claimed in claim 1, wherein:

the countermeasure-of-noise command torque calculation section calculates the countermeasure-of-noise command torque, so that a deviation of the countermeasure-of-noise command torque from the current value of the command torque increases, as a magnitude of the current value of the command torque increases.

3. The driving-force distribution control system as claimed in claim 1, further comprising:

a road-surface friction coefficient detection section that detects a road-surface friction coefficient;

wherein the torque threshold value setting section sets the predetermined torque threshold value, so that the predetermined torque threshold value increases, as the road-surface friction coefficient increases.

4. The driving-force distribution control system as claimed in claim 3, wherein:

the torque threshold value setting section sets the predetermined torque threshold value, so that the road-surface friction coefficient and the predetermined torque threshold value are in direct proportion to each other.

5. The driving-force distribution control system as claimed in claim 1, further comprising:

a tight-corner period delivered torque calculation section that calculates a tight-corner period delivered torque suitable to prevent a tight-corner braking phenomenon when the vehicle rounds a tight corner; and a select-low processing section that selects a lower one of the tight-corner period delivered torque and the countermeasure-of-noise command torque by a select-low process;

wherein the clutch command torque control section outputs a command signal corresponding to the lower torque obtained by the select-low process to the friction clutch.

6. The driving-force distribution control system as claimed in claim 1, wherein:

the friction clutch comprises an electronically-controlled coupling, the coupling comprising an electromagnetic solenoid, an armature, a pilot clutch, a pilot cam having a cam groove, a main cam having a cam groove, a ball sandwiched between the cam grooves, and a main clutch interleaved between input and output shafts of the friction clutch; and wherein a friction torque, produced in the pilot clutch by an electromagnetic force with the electromagnetic solenoid energized, is transmitted to the pilot cam, and the friction torque, transmitted into the pilot cam, is further multiplied and converted into an axial torque acting in an axial direction of the input shaft of the friction clutch via the ball placed between the cam grooves, and the axial torque multiplied forces the main cam axially against the main clutch to produce a friction torque whose magnitude is proportional to a magnitude of a solenoid driving current applied to the electromagnetic solenoid, by forcing the main cam axially against the main clutch.

7. The driving-force distribution control system as claimed in claim 1, further comprising:

a left-wheel speed sensor that detects a left wheel speed; and a right-wheel speed sensor that detects a right wheel speed;

wherein the reversal-of-torque condition decision section determines that the reversal-of-torque condition is satisfied, when an absolute value of a wheel speed difference between the front and right wheel speeds becomes greater than or equal to a predetermined reversal-of-torque criterion.

8. The driving-force distribution control system as claimed in claim 1, further comprising:

a steer angle sensor that detects a steer angle;

wherein the reversal-of-torque condition decision section determines that the reversal-of-torque condition is satisfied, when the steer angle becomes greater than or equal to a predetermined reversal-of-torque criterion.

9. The driving-force distribution control system as claimed in claim 1, further comprising:

a wheel torque sensor that detects a secondary drive wheel torque inputted into the secondary drive wheels;

wherein the reversal-of-torque condition decision section determines that the reversal-of-torque condition is satisfied, when an amount of torque drop in the secondary drive wheel torque becomes greater than or equal to a predetermined reversal-of-torque criterion.

10. The driving-force distribution control system as claimed in claim 1, further comprising:

a wheel torque sensor that detects a secondary drive wheel torque inputted into the secondary drive wheels;

wherein the reversal-of-torque condition decision section determines that the reversal-of-torque condition is satisfied, when a time rate of decrease in the secondary drive wheel torque becomes greater than or equal to a predetermined reversal-of-torque criterion.

11. A driving-force distribution control system for a four-wheel-drive vehicle comprising:

a friction clutch through which a driving force produced by a driving power source is delivered to primary drive wheels and to secondary drive wheels at a distribution ratio based on an operating condition of the vehicle; and a four-wheel-drive vehicle controller configured to be electronically connected to the friction clutch for automatically controlling the distribution ratio, the four-wheel-drive vehicle controller comprising:

(a) a torque threshold value setting means for setting a lower limit torque, above which noise and vibrations take place within the friction clutch when an input direction of torque inputted into the friction clutch is reversed, as a predetermined torque threshold value;

(b) an input-torque past-history condition decision means for determining whether a past-history condition that a clutch input torque has been greater than or equal to the predetermined torque threshold value is satisfied when a command torque for the friction clutch is greater than or equal to the predetermined torque threshold value during a time period from a time when the command torque begins to rise from a zero torque level to a current execution cycle of the driving-force distribution control system;

(c) a command torque condition decision means for determining whether a command torque condition that a current value of the command torque, produced at the current execution cycle, is greater than or equal to the predetermined torque threshold value is satisfied;

(d) a reversal-of-torque condition decision means for determining whether a reversal-of-torque condition that an input direction of torque inputted into the friction clutch is reversed is satisfied;

(e) a countermeasure-of-noise command torque calculation means for calculating a countermeasure-of-noise command torque obtained by decreasingly compensating for the current value of the command torque when the past-history condition, the command torque condition, and the reversal-of-torque condition are all satisfied; and (f) a clutch command torque control means for outputting a command signal corresponding to the countermeasure-of-noise command torque to the friction clutch when the past-history condition, the command torque condition, and the reversal-of-torque condition are all satisfied.

12. The driving-force distribution control system as claimed in claim 11, further comprising:

a tight-corner period delivered torque calculation means for calculating a tight-corner period delivered torque suitable to prevent a tight-corner braking phenomenon when the vehicle rounds a tight corner; and a select-low processing means for selecting a lower one of the tight-corner period delivered torque and the countermeasure-of-noise command torque by a select-low process;

wherein the clutch command torque control section outputs a command signal corresponding to the lower torque obtained by the select-low process to the friction clutch.

13. The driving-force distribution control system as claimed in claim 12, wherein:

the tight-corner period delivered torque is set to a torque value that is lower than the countermeasure-of-noise command torque and corresponds to a substantially disengaged state of the friction clutch.

14. A method of controlling a torque distribution ratio of a four-wheel-drive vehicle employing a friction clutch through which a driving torque produced by a driving power source is delivered to primary drive wheels and to secondary drive wheels at a desired distribution ratio based on an operating condition of the vehicle, the method comprising:

(a) setting a lower limit torque, above which noise and vibrations take place within the friction clutch when an input direction of torque inputted into the friction clutch is reversed, as a predetermined torque threshold value;

(b) determining whether a past-history condition that a clutch input torque has been greater than or equal to the predetermined torque threshold value is satisfied when a command torque for the friction clutch is greater than or equal to the predetermined torque threshold value during a time period from a time when the command torque begins to rise from a zero torque level to a current execution cycle;

(c) determining whether a command torque condition that a current value of the command torque, produced at the current execution cycle, is greater than or equal to the predetermined torque threshold value is satisfied;

(d) determining whether a reversal-of-torque condition that an input direction of torque inputted into the friction clutch is reversed is satisfied;

(e) calculating a countermeasure-of-noise command torque obtained by decreasingly compensating for the current value of the command torque when the past-history condition, the command torque condition, and the reversal-of-torque condition are all satisfied; and (f) outputting a command signal corresponding to the countermeasure-of-noise command torque to the friction clutch when the past-history condition, the command torque condition, and the reversal-of-torque condition are all satisfied.

15. The method as claimed in claim 14, further comprising:

calculating a tight-corner period delivered torque suitable to prevent a tight-corner braking phenomenon when the vehicle rounds a tight corner; and selecting a lower one of the tight-corner period delivered torque and the countermeasure-of-noise command torque by a select-low process;

wherein a command signal corresponding to the lower torque obtained by the select-low process is output to the friction clutch.

16. The method as claimed in claim 15, further comprising:

detecting a left wheel speed and a right wheel speed;

calculating an absolute value of a wheel speed difference between the front and right wheel speeds; and determining that the reversal-of-torque condition is satisfied, when the absolute value of the wheel speed difference becomes greater than or equal to a predetermined reversal-of-torque criterion.

17. The method as claimed in claim 15, further comprising:
  detecting a steer angle; and
  determining that the reversal-of-torque condition is satisfied, when the steer angle becomes greater than or equal to a predetermined reversal-of-torque criterion.

18. The method as claimed in claim 15, further comprising:
  detecting a secondary drive wheel torque inputted into the secondary drive wheels; and
  determining that the reversal-of-torque condition is satisfied, when an amount of torque drop in the secondary drive wheel torque becomes greater than or equal to a predetermined reversal-of-torque criterion.

19. The method as claimed in claim 15, further comprising:
  detecting a secondary drive wheel torque inputted into the secondary drive wheels; and
  determining that the reversal-of-torque condition is satisfied, when a time rate of decrease in the secondary drive wheel torque becomes greater than or equal to a predetermined reversal-of-torque criterion.

20. The method as claimed in claim 15, wherein:
  the tight-corner period delivered torque is set to a torque value that is lower than the countermeasure-of-noise command torque and corresponds to a substantially disengaged state of the friction clutch.

* * * * *